United States Patent [19]

Takeda et al.

[11] Patent Number: 5,777,690

[45] Date of Patent: Jul. 7, 1998

[54] DEVICE AND METHOD FOR DETECTION OF MOVING OBSTACLES

[75] Inventors: Nobuyuki Takeda; Mutsumi Watanabe, both of Tokyo, Japan

[73] Assignee: Kabushiki Kaisha Toshiba, Kawasaki, Japan

[21] Appl. No.: 588,845

[22] Filed: Jan. 19, 1996

[30] Foreign Application Priority Data

Jan. 20, 1995 [JP] Japan .................................. 7-007446
Mar. 15, 1995 [JP] Japan .................................. 7-055292

[51] Int. Cl.$^6$ .............................. H04N 5/14; H04N 9/64; H04N 7/18
[52] U.S. Cl. ........................... 348/699; 348/155; 382/103; 382/236
[58] Field of Search ............................ 348/61, 113, 118, 348/119, 143, 148, 169, 699, 700, 154, 155, 150, 151, 152; 382/103, 107, 236

[56] References Cited

U.S. PATENT DOCUMENTS

| | | | |
|---|---|---|---|
| 4,692,806 | 9/1987 | Anderson et al. | 358/209 |
| 5,034,986 | 7/1991 | Karmann et al. | 382/103 |
| 5,067,014 | 11/1991 | Bergen et al. | 382/236 |
| 5,247,586 | 9/1993 | Gobert et al. | 382/107 |
| 5,259,040 | 11/1993 | Hanna | 382/41 |
| 5,473,364 | 12/1995 | Burt | 348/155 |
| 5,557,684 | 9/1996 | Wang et al. | 382/107 |

OTHER PUBLICATIONS

Weber et al., "Robust Computation of Optical Flow in a Multi-Scale Differential Framework", IEEE, pp. 12-19, (1993).

Tian et al., "Recovering 3D Motion of Multiple Objects Using Adaptive Hough Transform", IEEE, pp. 284-289, (1995).

*Primary Examiner*—Tommy P. Chin
*Assistant Examiner*—Nhon T. Diep
*Attorney, Agent, or Firm*—Finnegan, Henderson, Farabow, Garrett & Dunner, L.L.P.

[57] ABSTRACT

A moving obstacle detecting device detects moving objects, may be applied in the field of autonomous vehicles, intelligent robots, video monitoring system and similar systems. The device includes an optical flow extracting unit 1 for extracting optical flows for the respective local regions in the measured images, an focus of expansion (F.O.E.) calculating unit for calculating an F.O.E. of a straight line extended by the extracted optical flows, and a moving obstacle detecting unit for analyzing a temporal change of the calculated F.O.E. to judge the presence of the moving obstacle when the temporal positional change is larger than a predetermined variation quantity.

8 Claims, 32 Drawing Sheets

FIG. 24A
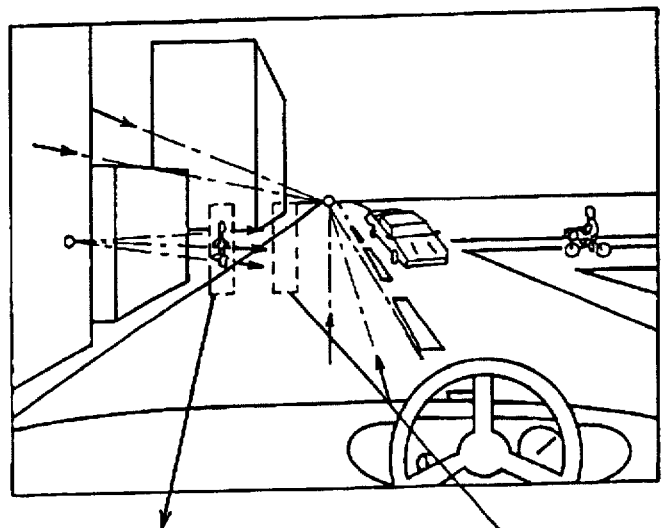
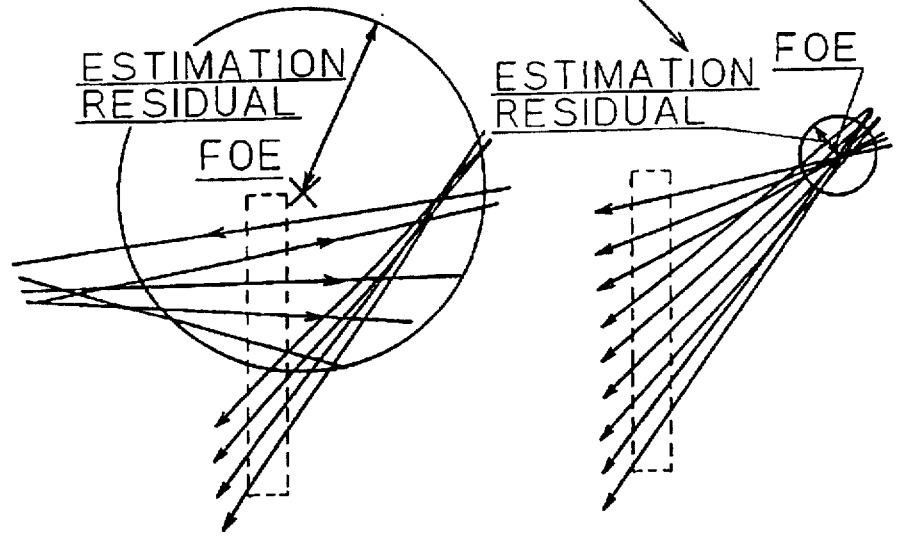
FIG. 24B
BACKGROUND REGION+
MOVING OBSTACLE REGION
FIG. 24C
BACKGROUND REGION

ROTATION COMPONENT REMOVING UNIT 300

( FLOW CHART OF THIS INVENTION )

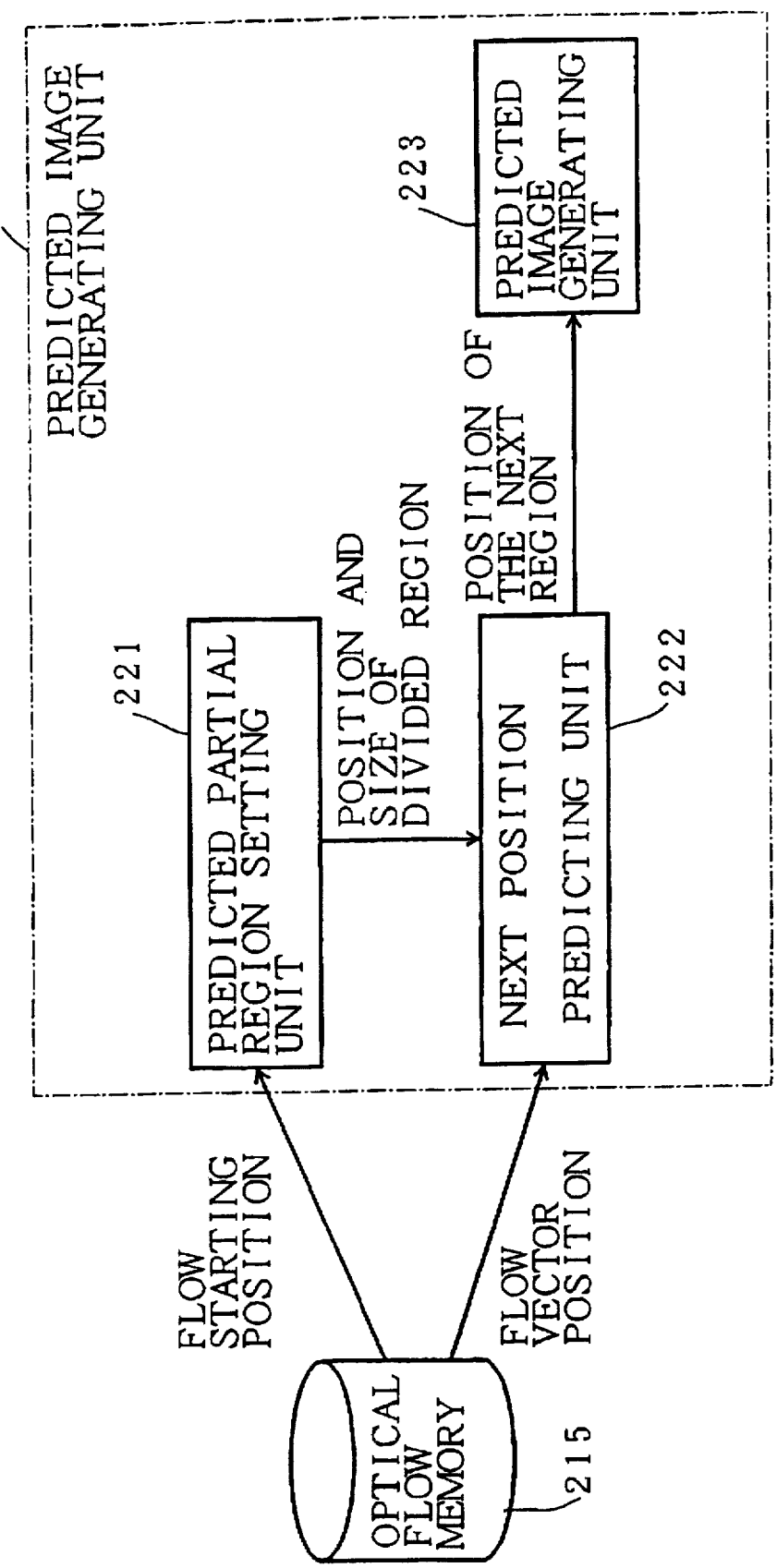

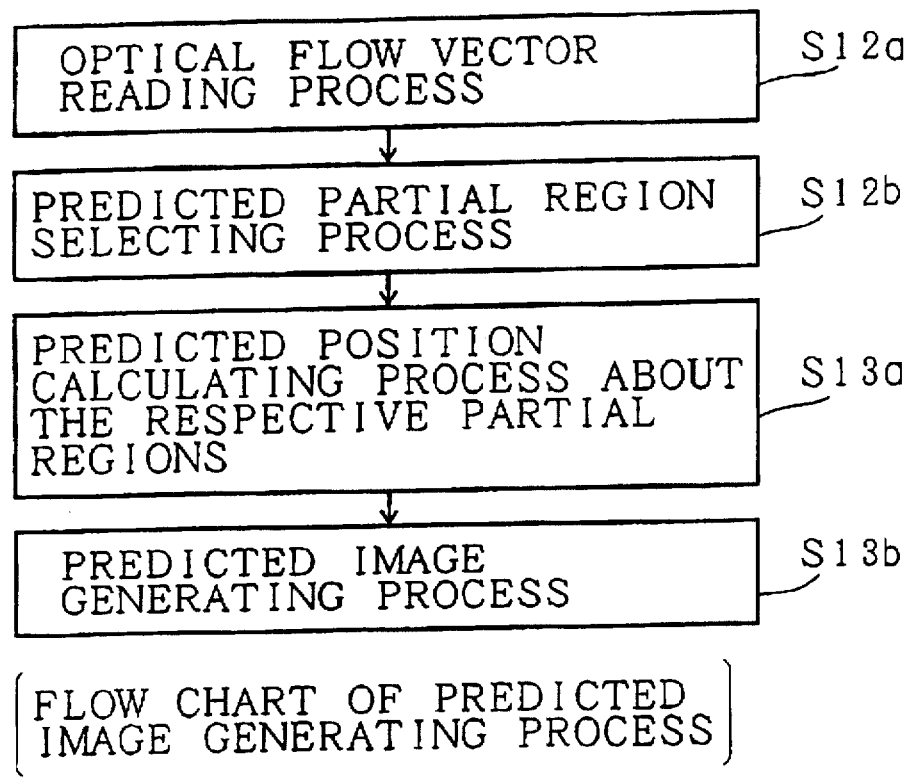

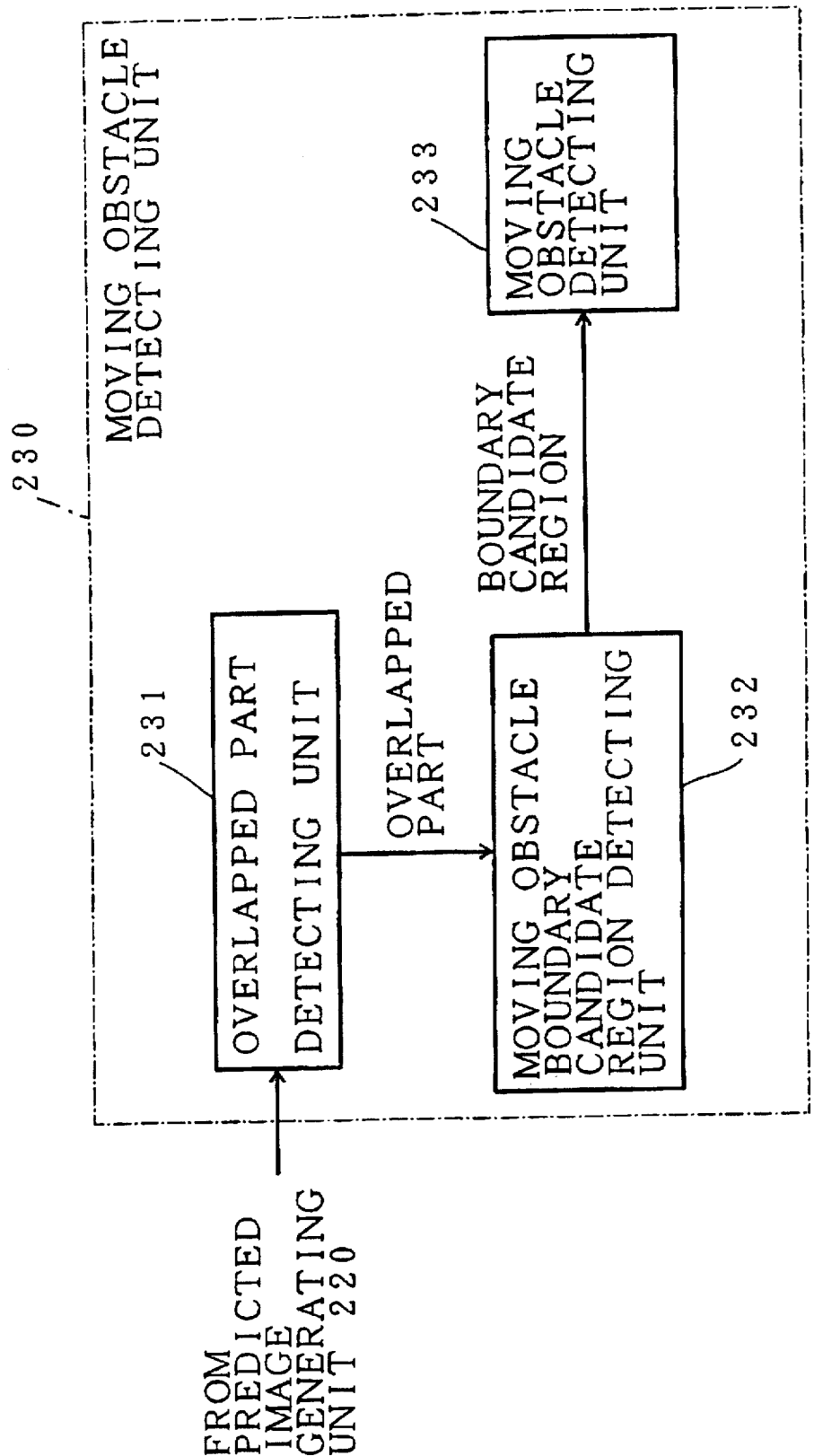

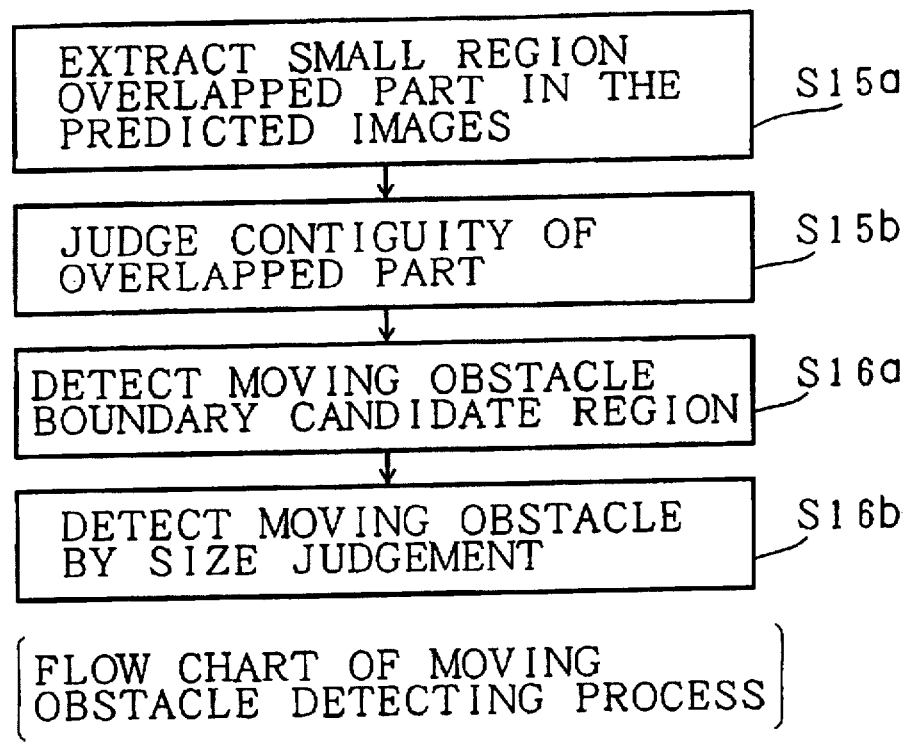

(MOVEMENT OF SMALL REGION IN PREDICTED IMAGE)

MOVEMENT OF BACKGROUND REGION WHEN THE OBSERVER MOVES LINEARLY

MOVEMENT OF BACKGROUND REGION WHEN THE OBSERVER ROTATES (COUNTERCLOCKWISE)

INTERFERENCE WHEN A MOVING OBSTACLE APPEARS

DEVICE AND METHOD FOR DETECTION OF MOVING OBSTACLES

BACKGROUND OF THE INVENTION

1. Field of the Invention

This invention relates to a device and method for detecting moving objects, which finds application in the field of autonomous vehicles, intelligent robots, video monitoring system and the like.

2. Discussion of the Related Art

With the recent miniaturization and functional upgrading of image sensors such as television cameras by the progress of integrating technology and the miniaturization and functional sophistication of processors for processing the images obtained by image sensors, active implementation studies are going on in the area of autonomous vehicles, intelligent robots, high grade video monitoring system employing television cameras as their sensors.

In order to construct systems such as autonomous vehicles, intelligent working robots and high grade video monitoring system, it is indispensable to provide for a moving obstacle detecting device for detecting a moving obstacle from the image stably and at high speed, for information about the moving obstacle has to be obtained by taking in ever-changing images and processing the images to detect the moving obstacle.

There is well known a moving obstacle detecting device utilizing an image series sequentially produced from a static observer, such as a fixed camera or the like, carrying out image subtractions between the sequential images, thresholding to detect the region of an invading object or obstacle. When this common method is applied to a moving observer such as an autonomous vehicle, the produced image moves as the observer moves and the whole background also changes, so that it becomes difficult to stably separate the region of the moving obstacle from the background.

There has been proposed, however, a technology capable of directly detecting information about a motion. For instance, there is known an optical flow concept in image processing technology which is relevant to the movement of a local region unit in the image. The subject of optical flow extraction is being widely studied as a technology for directly detecting information about a moving object in an image in the field of image information processing technology.

In the optical flow technology, any movement in a three-dimensional space is projected on an image plane and a vector is generated for each local region of the image, so that the inter-separation of the moving obstacle and the background can be more stably achieved as compared with the above-mentioned change detection method.

The detection process by the optical flow, however, has the disadvantages that since it is basically designed to be executed for a local region wherein an image, the estimation precision is lowered in environments where there exist flatness, fluctuation and/or noise in the brightness change.

Accordingly, when the device may happen to be used in an outdoor environment such as on an autonomous vehicle, there should be employed such a processor that operates stably even if an error exists in a part of each optical flow.

Thus, in order to stably extract movement information in such an outdoor environment, a processor indifferent to the above-mentioned error is necessary.

As the observer moves, the background region also moves, and because of the compounding of both movements, a moving obstacle cannot be accurately detected.

Accordingly, there is demanded a moving obstacle detecting device not only capable of detecting a moving obstacle with high precision but also capable of detecting a moving obstacle as soon as it appears even if the observer moves and the background region also moves according to the movement of the observer, without the aid of any processing means for assuring stable operation despite an error that may occur in a part of the optical flow.

SUMMARY OF THE INVENTION

It is, therefore, a primary object of this invention to provide an improved device and method for detecting a moving obstacle stably and at high speed even when an observer moves.

According to a first aspect of this invention, there is provided a moving obstacle detecting device including an image taking means for taking in a plurality of images sequentially picked up while moving, a motion vector extracting means for extracting a plurality of motion vectors each representing a position change of the object between the images taken by the image taking means, an intersection calculating means for sequentially calculating the point of intersection of straight linear extensions of the plurality of motion vectors extracted by the motion vector extracting means, and a moving obstacle detecting means adapted to analyze the temporal positional change of a point of intersection as calculated sequentially by the intersection calculating means and judge the existence of a moving obstacle within the image when the temporal positional change is larger than a predetermined change quantity.

In this device according to this first aspect of this invention, a focus of expansion (hereinafter called as F.O.E.) of the motion vectors extracted by processing the images observed by a moving observation means is sequentially calculated to obtain a temporal position displacement, so that the appearance of a moving obstacle can be detected stably and at high speed even when the moving observation means moves linearly, resulting in a great practical effect.

According to a second aspect of this invention, there is provided a moving obstacle detecting device including an image taking means for taking in a plurality of images sequentially picked up while moving, a motion vector extracting means for extracting a plurality of motion vectors each representing a position change of the object between the images taken by the image taking means, a linear equation calculating means for calculating equations of straight linear extensions of the respective motion vectors extracted by the motion vector extracting means, an intersection calculating means for sequentially calculating an intersection of the straight lines based on the equations of the respective straight lines produced by the linear equation calculating means, and a moving obstacle detecting means adapted to analyze the temporal positional change of a point of intersection as calculated sequentially by the intersection calculating means and judge the existence of a moving obstacle within the image when the temporal positional change is larger than a predetermined change quantity.

According to a third aspect of this invention, there is provided a moving obstacle detecting device including an image taking means for taking in a plurality of images of background regions containing a moving obstacle which are sequentially picked up while moving, a motion vector extracting means for extracting a plurality of motion vectors each representing a position change of the object between the images taken by the image taking means, a motion vector selecting means for selecting a plurality of background region motion vectors each representing a position change of the background region other than said moving obstacle already known from the motion vectors extracted by the motion vector extracting means, a rotation movement estimating means for estimating a rotation component of a rotary motion of the image taking means based on the background region motion vectors selected by the motion vector selecting means, a motion vector correcting means for deleting the rotation component of the rotation movement of the image taking means based on the motion vectors extracted by the motion vector extracting means employing the rotation component estimated by the rotation movement estimating means, an intersection calculating means for sequentially calculating the point of intersection of straight linear extensions of the plurality of motion vectors corrected by the motion vector correcting means, and a moving obstacle detecting means adapted to analyze the temporal positional change of a point of intersection as calculated sequentially by the intersection calculating means and judge the existence of a moving obstacle within the image when the temporal positional change is larger than a predetermined change quantity.

According to a fourth aspect of this invention, there is provided a moving obstacle detecting device including an image taking means for taking in a plurality of images of a background region containing a moving obstacle sequentially picked up while moving, an image storage means for storing an image of a background region except the moving obstacle in the image taken by the image taking means, a temporal section extracting means for extracting a section horizontal with a temporally moving direction among a group of images stored in the image storage means, an intersection detecting means for obtaining a plurality of straight lines representing position changes of the object between images from the section extracted by the temporal section extracting means for detection and for sequentially calculating an intersection of these straight lines, and a moving obstacle detecting means adapted to analyze the temporal positional change of a point of intersection as calculated sequentially by the intersection detecting means and judge the existence of a moving obstacle within the image when the position change is larger than a predetermined change quantity.

The device according to this fourth aspect of this invention extracts a section in parallel with a temporally moving direction among a picture obtained by a moving observing means, processes the section to sequentially calculate an intersection, and obtains the temporal position displacement, so that the device can detect the appearance of the moving obstacle stably and at high speed when the moving observing means linearly moves to provide a great practical effect.

According to a fifth aspect of this invention, there is provided a moving obstacle detecting device including an image taking means for taking in a plurality of images sequentially picked up while moving, a motion vector extracting means for extracting a plurality of motion vectors each representing a position change of the object between the images taken by the image taking means, a region setting means for setting a plurality of small regions within the respective images, an intersection estimating means for extracting a plurality of motion vectors designating the small regions set by the region setting means from the motion vector extracting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by the intersection estimating means, and a moving obstacle detecting means for detecting a moving obstacle picked up within the image based on the residual value of estimation calculated by the small region estimation residual calculating means.

The moving obstacle detecting device according to this fifth aspect of this invention obtains motion vectors produced by processing images observed by the moving observing means, estimates intersections from motion vectors within the set small regions, processes the intersection estimation residual within the small region, so that a moving obstacle can be separately detected stably and at high speed when a moving observing means moves linearly, providing a great practical effect.

According to a sixth aspect of this invention, there is provided a moving obstacle detecting device including an image taking means for taking in a plurality of images of a background region containing a moving obstacle which are sequentially picked up while moving, a motion vector extracting means for extracting a plurality of motion vectors each representing a position change of the object between the images taken by the image taking means, a motion vector selecting means for selecting a plurality of background region motion vectors each representing a position change of the background region other than said moving obstacle already known from the motion vectors extracted by the motion vector extracting means, a rotation movement estimating means for estimating a rotation component of a rotary motion of the image taking means based on the background region motion vectors selected by the motion vector selecting means, a motion vector correcting means for deleting the rotation component of the rotary motion of the image taking means based on the motion vectors extracted by the motion vector extracting means employing the rotation component estimated by the rotation movement estimating means, a region setting means for setting a plurality of small regions within the respective images, an intersection estimating means for extracting a plurality of motion vectors designating the small regions set by the region setting means from the motion vector correcting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by the intersection estimating means, and a moving obstacle detecting means for detecting a moving obstacle picked up within the image based on the residual of estimation calculated by the small region estimation residual calculating means.

According to a seventh aspect of this invention, there is provided a moving obstacle detecting device including an image taking means for taking in a plurality of images sequentially picked up while moving, a motion vector extracting means for extracting a plurality of motion vectors each representing a position change of the object between the images taken by the image taking means, a region setting means for setting a plurality of small regions within the respective images, an intersection estimating means for acquiring a plurality of motion vectors designating the small regions set by the region setting means from the motion vector extracting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by the intersection estimating means, a total estimation residual calculating means for totalizing residual of estimation of a plurality in the small regions of the same image calculated by the small region estimation residual calculating means to calculate all or a part of total residual of estimation on the above-mentioned image plane, and a moving obstacle detecting means for detecting a moving obstacle picked up within the image based on the distribution of the total residual of estimation in the images calculated by the total estimation residual calculating means.

The moving obstacle detecting device according to the seventh aspect of this invention obtains motion vectors obtained by processing images observed by a moving observer means, estimates intersections from motion vectors within the set small regions, sequentially integrates the F.O.E. estimation residual within the small regions for each small region, and processes the distribution of total residual value of F.O.E. estimation as the result of the integration within the images to separately detect a moving obstacle stably and at high speed when the moving observer means moves linearly, providing a great practical effect.

According to an eighth aspect of this invention, there is provided a moving obstacle detecting device including an image taking means for taking in a plurality of images of an object in a time sequence, a motion vector extracting means for analyzing temporal changes of the respective images produced from the image taking means to extract motion vector information representing the motions of local region units within each image, a predicted image generating means for dividing each image into a partial region centered around a part within the images as designated by the motion vector based on the motion vector information provided by the vector extracting means to implement with the partial region unit a predicted image corresponding to an image at the next instant in the time sequence, and a moving obstacle detecting means for analyzing if the motions of the respective partial regions in the predicted image made by the predicted image generating means exist on the motion vectors to detect a moving obstacle.

According to a ninth aspect of this invention, there is provided a moving obstacle detecting device including an image taking means for taking in a plurality of images of an object in a time sequence, a motion vector extracting means for analyzing temporal changes of the respective images produced from the image taking means to extract motion vector information representing the motions of local region units within each image, a predicted image generating means for dividing each image into a partial region centered around a part within the image as designated by the motion vector based on the motion vector information provided by the vector extracting means to implement with the partial region unit a predicted image corresponding to an image at the next instant in the time sequence, and a moving obstacle detecting means for detecting the presence or absence of an overlapped part of the partial regions in the predicted image prepared by the predicted image generating means to detect the presence of a moving obstacle based on the overlapped part.

According to a tenth aspect of this invention, there is provided a moving obstacle detecting device including an image taking means for taking in a plurality of images of an object in a time sequence, a motion vector extracting means for analyzing temporal changes of the respective images produced from the image taking means to extract motion vector information representing the motions of local region units within the respective images, a predicted image generating means for dividing each image into a partial region centered around a part within the image as designated by the motion vector based on the motion vector information provided by the vector extracting means to implement with the partial region unit a predicted image corresponding to an image at the next instant in the time sequence, and a moving obstacle detecting means for extracting a overlapped part of the partial regions in the predicted image from the predicted image generating means and for measuring the size of the overlapped part to judge the presence of a moving obstacle when the measured size is larger than a predetermined value.

According to the eighth to the tenth aspects, the motion vector information representing the motion of a local region unit in the images is extracted by sequentially obtaining images of an object from the observing means and analyzing the temporal changes of the images by the motion vector extracting means. For instance, if the observing means moves linearly, the motion vector of the static background region in an environment exists on a straight line originating at one point (intersection). The image is divided into partial regions in the predicted image generating means, the position at the next instant is estimated with the partial region centered around the point where the motion vector is generated to implement the predicted image. In the moving obstacle detecting means, if a region shielded by a moving obstacle in the background region is detected by extracting the overlap of the plurality of regions in the predicted image, the presence of the moving obstacle is judged.

By determining the size of "the overlap by a plurality of regions" extracted thereby and excluding detection errors about motion vectors by comparison with a threshold value, a higher precision is ensured.

Thus, according to this invention, a moving obstacle included in the image taken by an observer can be simply and very precisely detected while the observer moves. Thus, a moving obstacle detecting device most suitable for autonomous vehicles, intelligent robots, video monitoring system, etc. is provided.

BRIEF DESCRIPTION OF THE DRAWINGS

Other objectives and advantages of this invention will be more readily apparent from the following detailed description provided in conjunction with the following figures, of which:

FIG. 24 is an illustration of the second embodiment;

FIG. 31 is a block diagram for a specific embodiment of a predicted image generating unit illustrated in FIG. 27;

FIG. 32 is a flow chart of the processing flow corresponding to the respective components of the predicted image generating unit of FIG. 31;

FIG. 33 is a block diagram for a specific embodiment of the moving obstacle detecting unit illustrated in FIG. 27;

FIG. 34 is a flow chart of the processing flow corresponding to the respective components of the moving obstacle detecting unit of FIG. 33.

DETAILED DESCRIPTION OF THE INVENTION FIRST EMBODIMENT

Referring, now, to FIGS. 1 to 9, there is shown a first embodiment of this invention.

Figure 1:
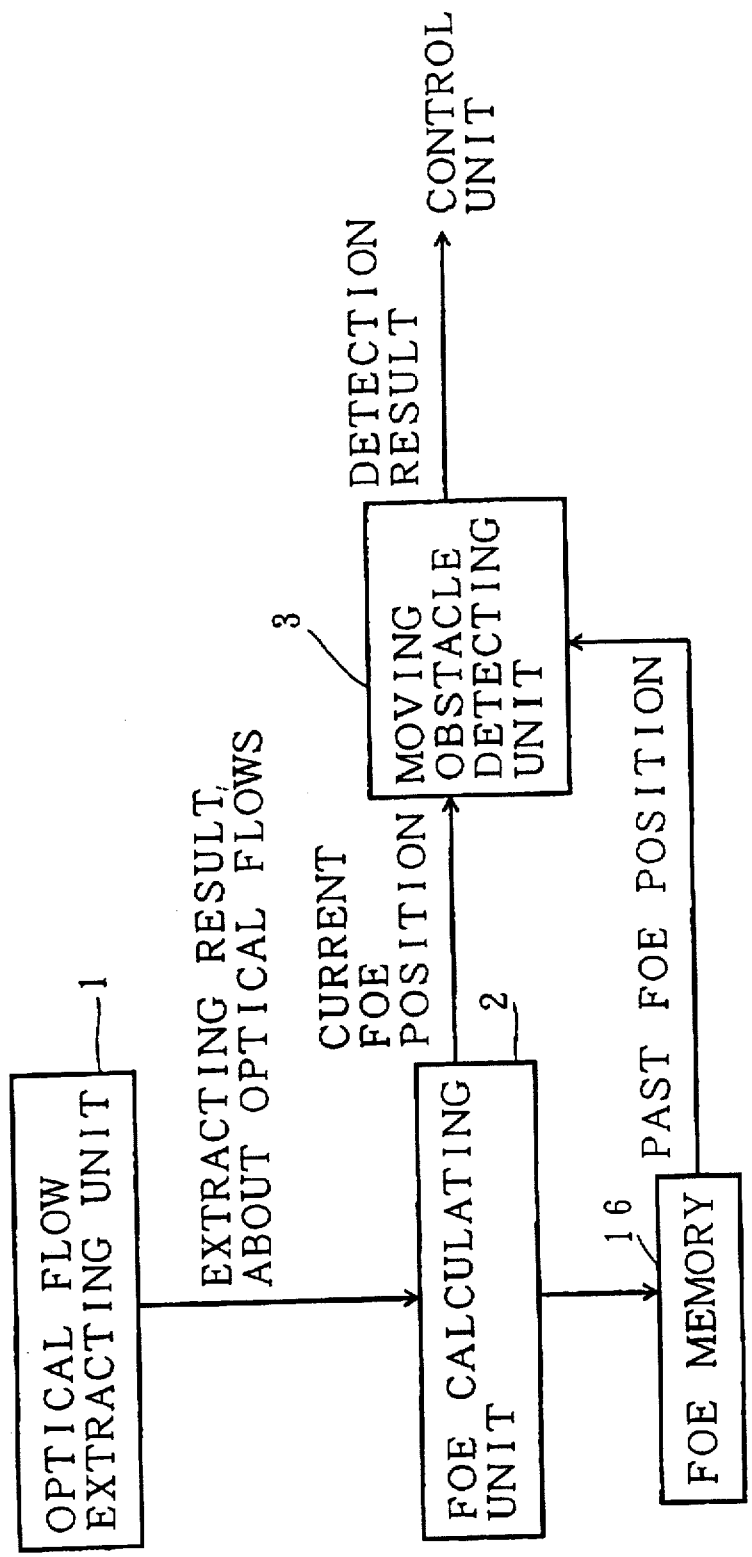
FIG. 1 is a schematic block diagram showing the overall structure of a first embodiment of this invention.
Figure 2:
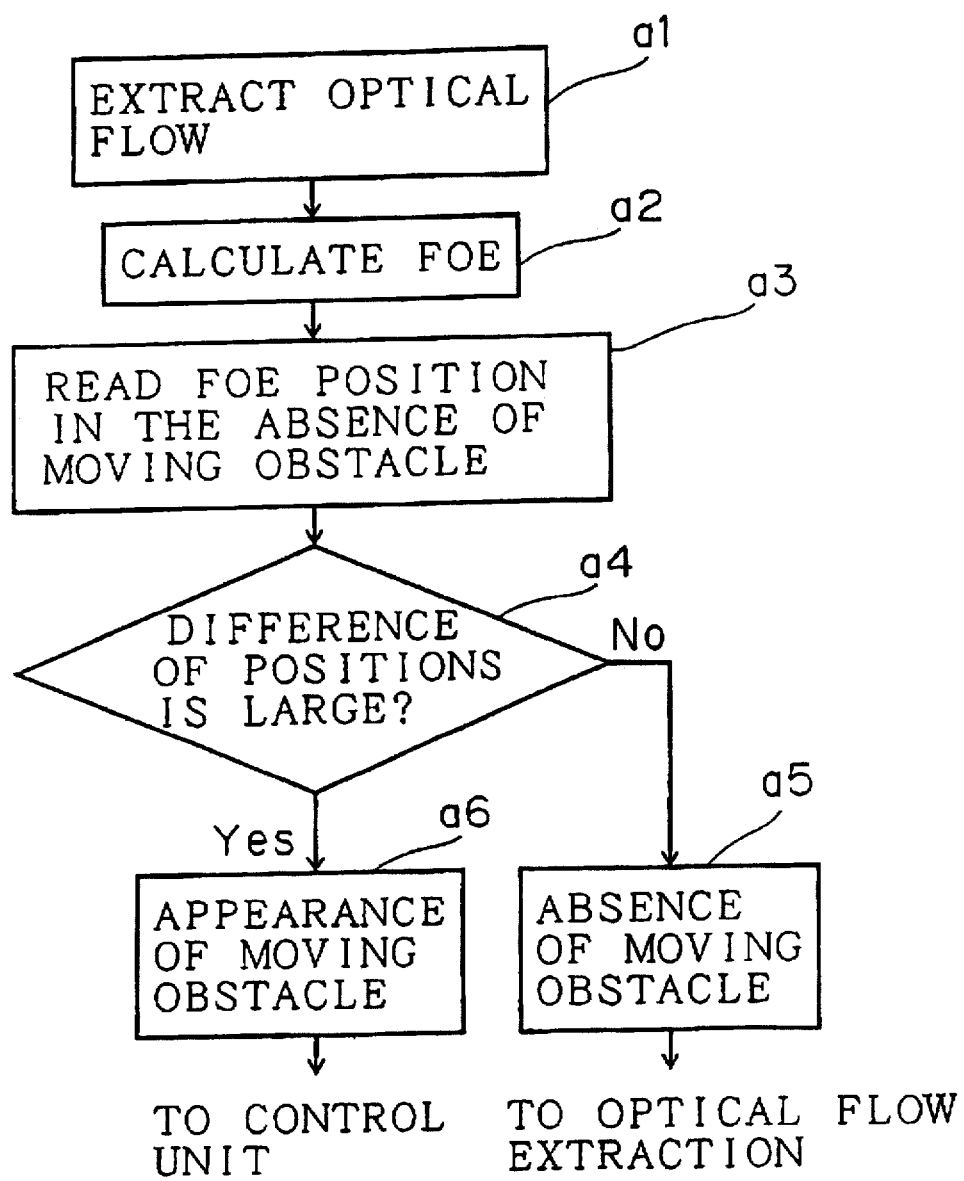
FIG. 2 is a flow chart of the structure of FIG. 1.

FIG. 1 shows a schematic block diagram showing the overall structure and information flow of this embodiment, and FIG. 2 shows a flow chart of a process corresponding to information flow in the structure of FIG. 1.

Assuming that an observer linearly moves in this embodiment, the optical flow of a stationary background region in an environment exists on a straight line originating at one point (F.O.E.: focus of expansion).

An optical flow extracting unit 1 analyzes a temporal change of a television camera image in the observer to extract an optical flow representing the motion of a local unit region (see step a1 of FIG. 2).

An F.O.E. calculating unit 2 converts the optical flow into linear equations, solves these equations in a simultaneous system to seek an F.O.E. position as a projection point in the direction of straight forward movement of the observer for storage (see step a2 of FIG. 2).

A moving obstacle detecting unit 3 firstly reads out an F.O.E. position at an instant when there is no moving obstacle (see step a3 of FIG. 2). Secondly the unit 3 analyzes difference between the current F.O.E. position and the F.O.E. position in the absence of any moving obstacle which is stored in a storage area to detect appearance of a moving obstacle (see step a4 of FIG. 2).

When there is no moving obstacle, the F.O.E. exists near the position at the previous time-point (see step a5 of FIG. 2).

In contrast, when a moving obstacle appears, a different movement due to the obstacle appears in the image and a solution of simultaneous equations including this optical flow is varied greatly in comparison with that in the absence of the moving obstacle, so that the appearance of the moving obstacle can be detected by analyzing the quantity of change. (see step a6 of FIG. 2).

The respective components will be described hereinafter in detail.

[OPTICAL FLOW EXTRACTING UNIT 1]

Figure 3:
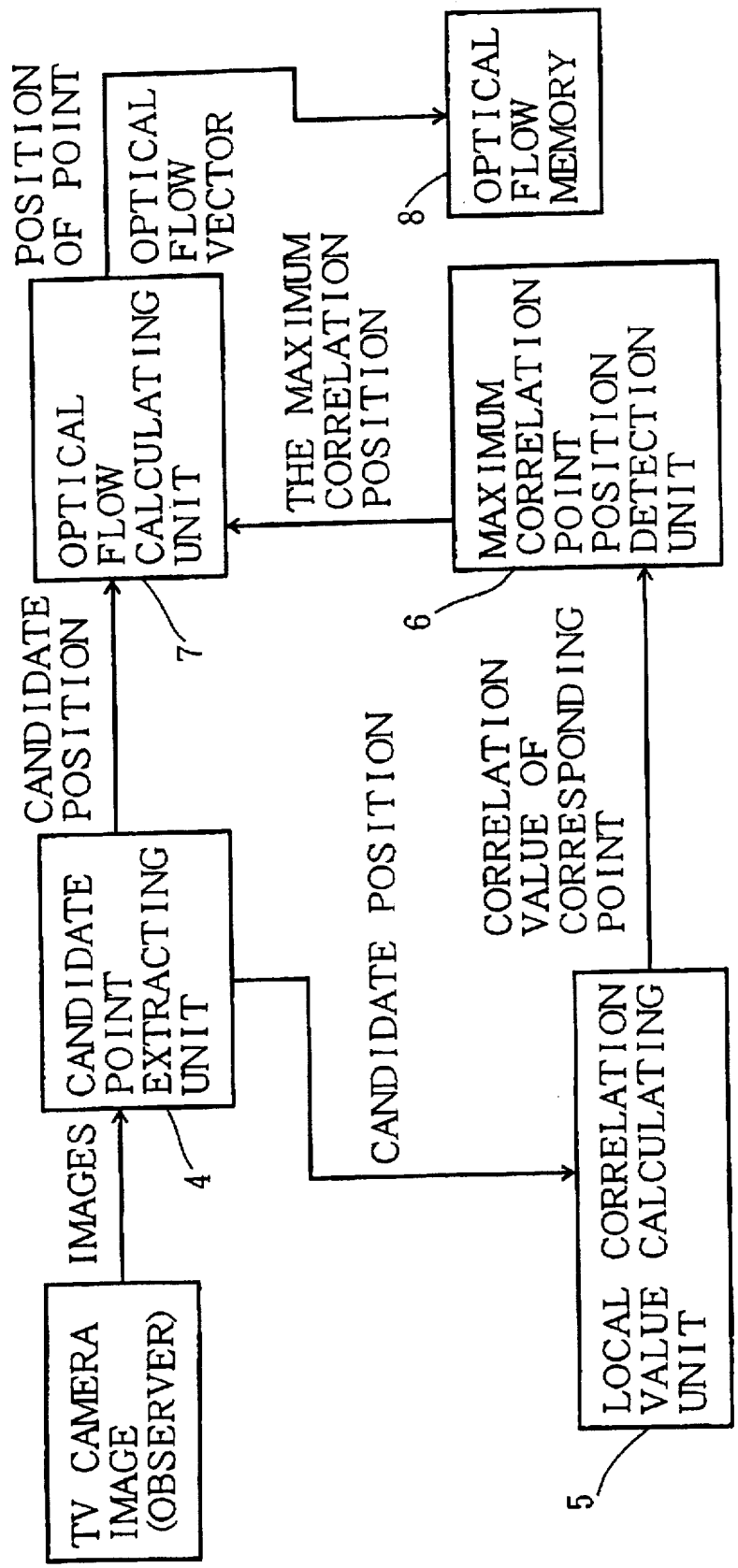
FIG. 3 is a schematic block diagram showing a specific typical structure of an optical flow extracting unit.
Figure 4:
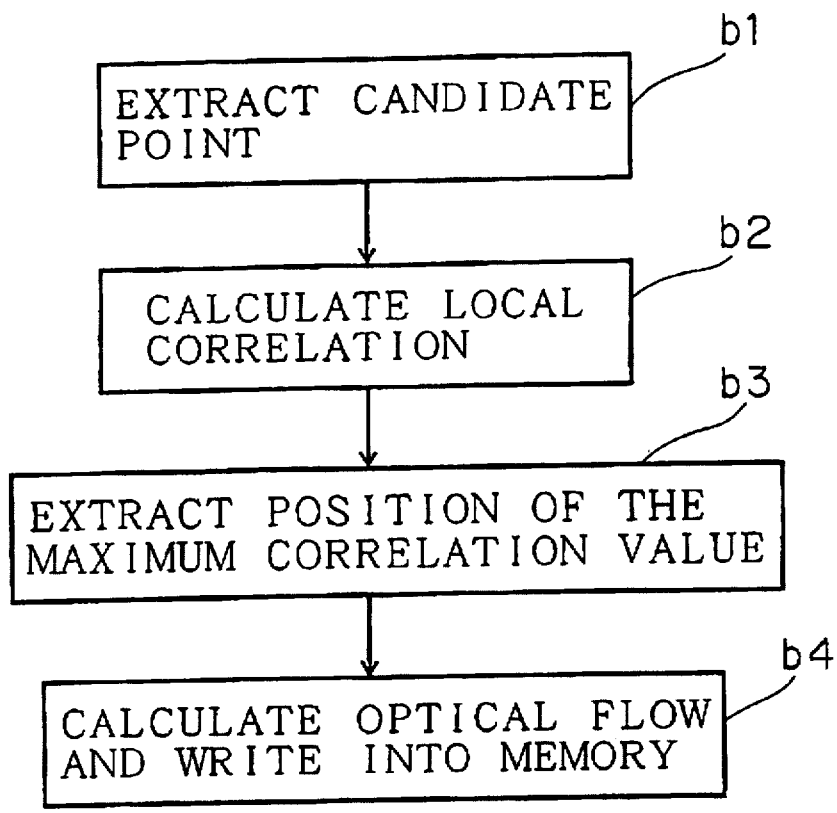
FIG. 4 is a flow chart of an optical flow extracting process.

FIG. 3 shows a specific structure of the optical flow extracting unit 1. Here, an example of optical flow detection using the local correlation of characteristic points in the image is described. FIG. 4 shows a flow chart of an optical flow extracting process corresponding to the respective components of the optical flow extracting unit 1, which corresponds to a detailed flow chart of the step a1 of FIG. 2.

A candidate point detecting unit 4 detects a group of candidate points to seek an optical flow in a reference image (see step b1 of FIG. 4).

In practice, a local region of N pixels×N pixels is set in the image, and a calculation of the intensity variance is executed over a whole region where a moving obstacle may be expected to appear. The size N of the region is a constant set according to the kind and size of an object to be detected. Since the point having a small variance is included in a partial region which is flat in intensity and substantially lowers the extraction precision of the optical flow, it is excluded from candidate points. Only the points variance values of which are larger than a predetermined threshold value are sequentially selected as the candidate point, and the location of the candidate point is transmitted to a local correlation value calculating unit 5.

The local correlation value calculating unit 5 sequentially calculates a correlation value between a local region of M pixels×M pixels centered at the above-mentioned candidate point $(X_o, Y_o)$ in the reference image and a local region of M pixels×M pixels around each point within a neighboring region near said candidate point in the image at the next instant (see step b2 of FIG. 4). The size of said neighboring region is set in accordance with the speed of a moving obstacle. The size M of a correlation window is a constant set in accordance with the kind, size and speed of an object to be detected.

The correlation value S is calculated by means of an equation given below, wherein $I(x, y)$ and $J(x, y)$ are the pixel intensity values of the point $(x, y)$ in the reference image and the next image, and I and J are the average intensity values within the candidate point neighboring regions in the reference image and the next image, respectively.

$$\frac{\Sigma_{x,y}\Sigma_{k,l}I(x, y)J(x-k, y-l)}{\sqrt{\Sigma_{x,y}I(x, y)^2} \sqrt{\Sigma_{x,y}J(x, y)^2}} \quad (1)$$

A maximum correlation point position detection unit 6 obtains a position $(X_s, Y_s)$ of the point where the correlation value is maximal in the image of the next instant (see step b3 of FIG. 4).

An optical flow calculating unit 7 calculates the difference between both positions $(v_x, v_y)=(X_s-X_o, Y_s-Y_o)$ for writing into an optical flow memory 8 as an optical flow vector at the point $(X_o, Y_o)$ of the reference image (see step b4 of FIG. 4).

Figure 5:
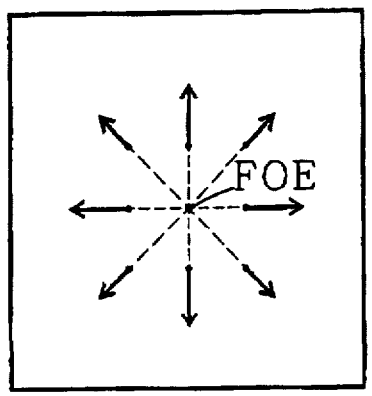
FIG. 5 shows the relation between an optical flow and F.O.E. of a background region in a system involving a linearly moving observer.

When the moving observer moves linearly, the optical flow of an object standing still relative to the environment is obtained as an optical flow originating at one point as shown in FIG. 5. This one point is called as an F.O.E. which is an intersection of straight lines extending from the respective optical flows.

[F.O.E. CALCULATING UNIT 2]

Figure 6:
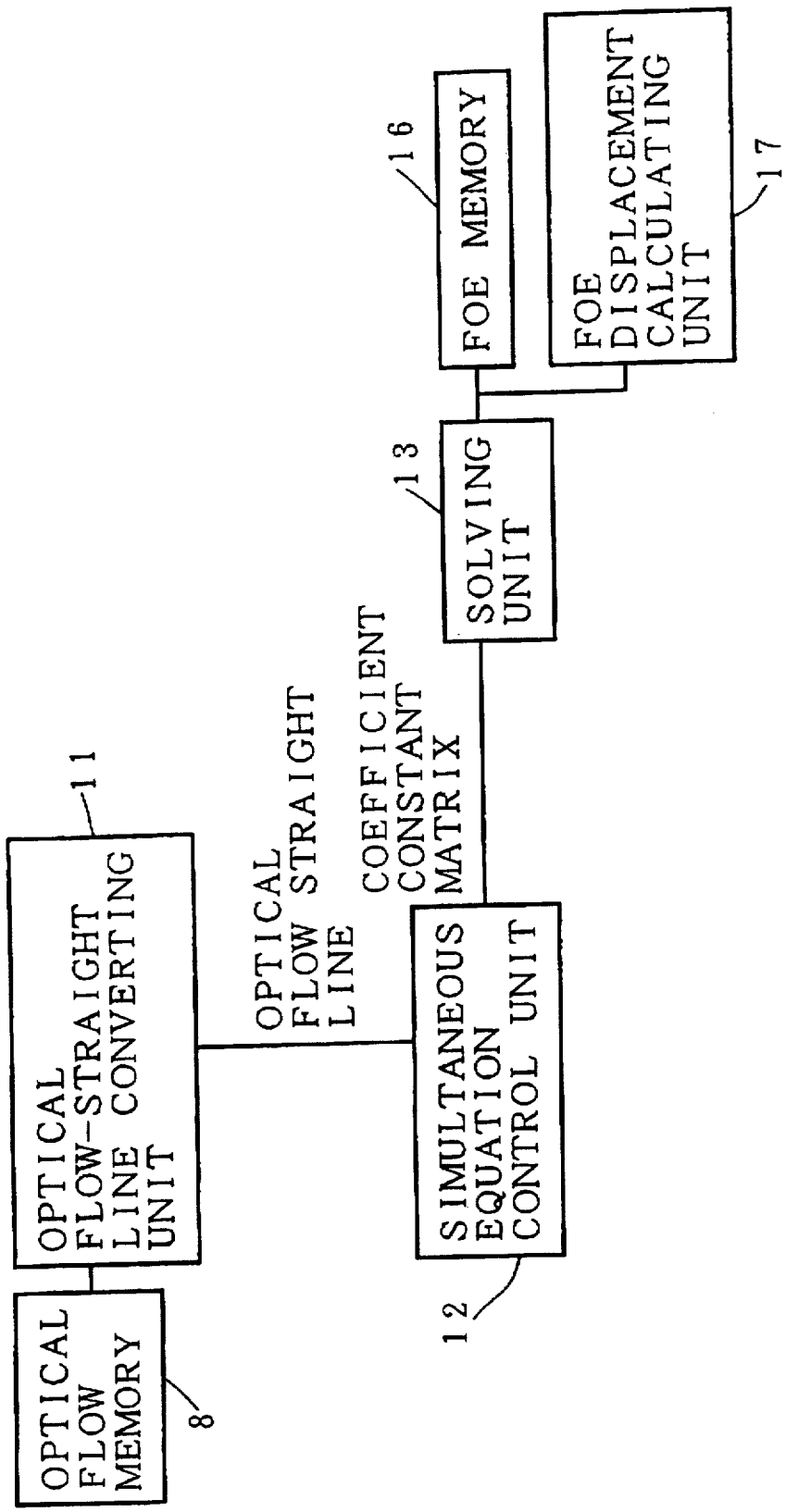
FIG. 6 shows a typical structure of an F.O.E. calculating unit.
Figure 7:
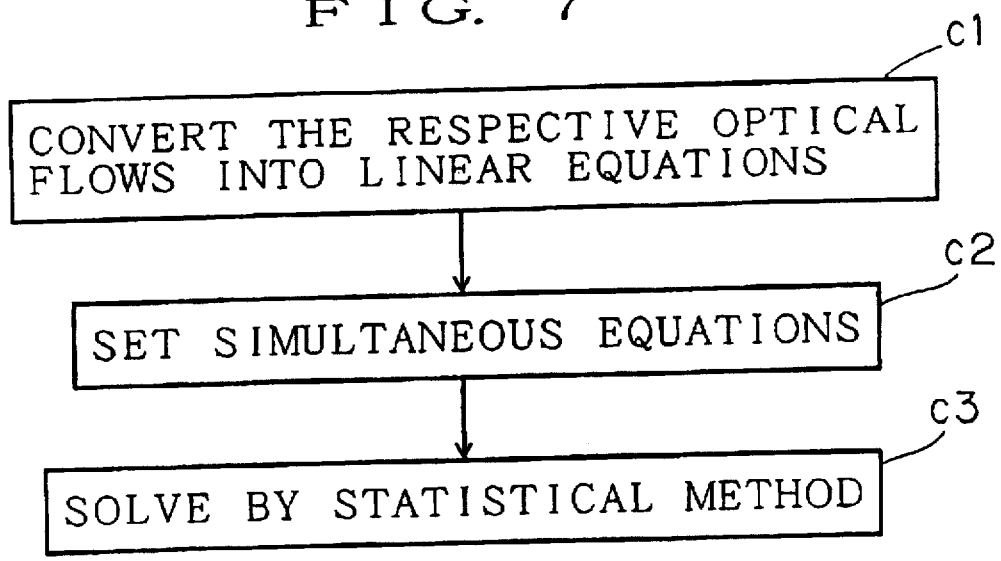
FIG. 7 is a flow chart of an F.O.E. calculating process.

FIG. 6 shows a specific embodiment of an F.O.E. calculating unit 2, and FIG. 7 shows a flow chart of an F.O.E. calculating process corresponding to the components of the unit 2, which corresponds to the flow at step a2 of FIG. 2.

An optical flow-straight line converting unit 11 seeks an equation of a straight line from the respective optical flow vectors stored in the optical flow memory 8 (see step c1 of FIG. 7).

Assuming that an optical flow vector $(v_x, v_y)$ is obtained at the point $(X_o, Y_o)$, the equation of this straight line is expressed as follows:

$$vxY-vyX+(vyXo-vxYo)=0 \quad (2)$$

A simultaneous equation control unit 12 sets a coefficient matrix A and a formal matrix B of the simultaneous equations into a storage area to obtain an intersection of these straight lines (see step c2 of FIG. 7). A and B are given by the following equations in which L represents a synthetic equation of the point where an optical flow vector is obtained.

$$A = \begin{bmatrix} vy(0) & -vx(0) \\ vy(1) & -vx(1) \\ \vdots & \vdots \\ vy(L-1) & -vx(L-1) \end{bmatrix} \quad (3)$$

$$B = \begin{bmatrix} vy(0)Xo(0) - vx(0)Yo(0) \\ vy(1)Xo(1) - vx(1)Yo(1) \\ \vdots \\ vy(L-1)Xo(L-1) - vx(L-1)Yo(L-1) \end{bmatrix} \quad (4)$$

A solving unit 13 reads the matrixes, and seeks the solution x (F.O.E. value $(X_F, Y_F)$) to the equation $$Ax=B \quad (5)$$

by a numerical value calculation method, such as the LU decomposition method and singular value decomposition method, for storage in an F.O.E. memory 16 (see step c3 of FIG. 7).

[MOVING OBSTACLE DETECTING UNIT 3]

Figure 8:
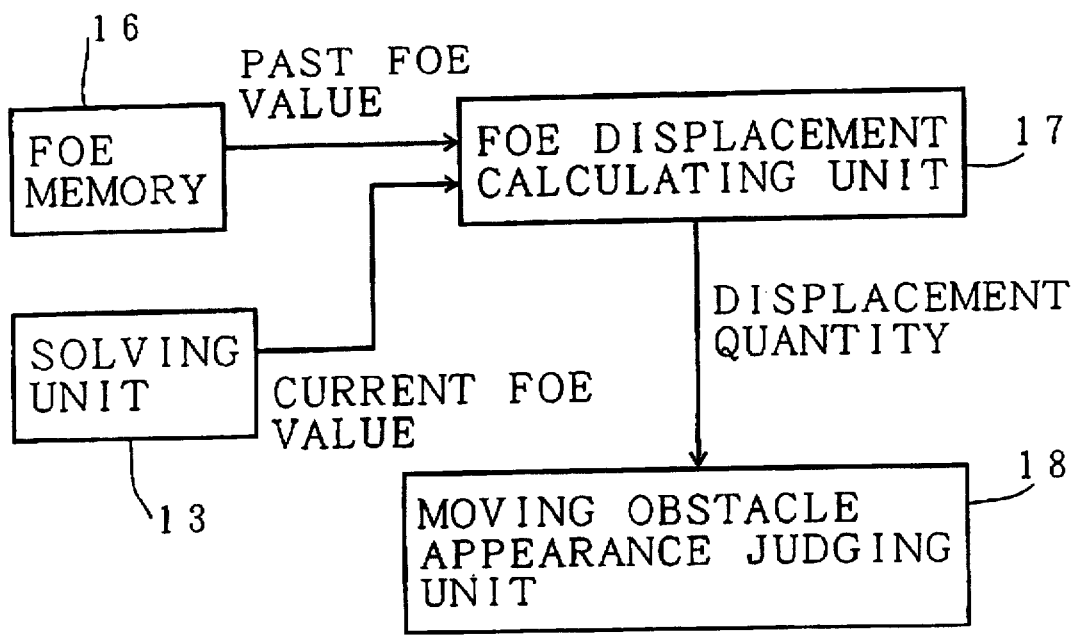
FIG. 8 shows a typical structure of a moving obstacle detecting unit.
Figure 9:
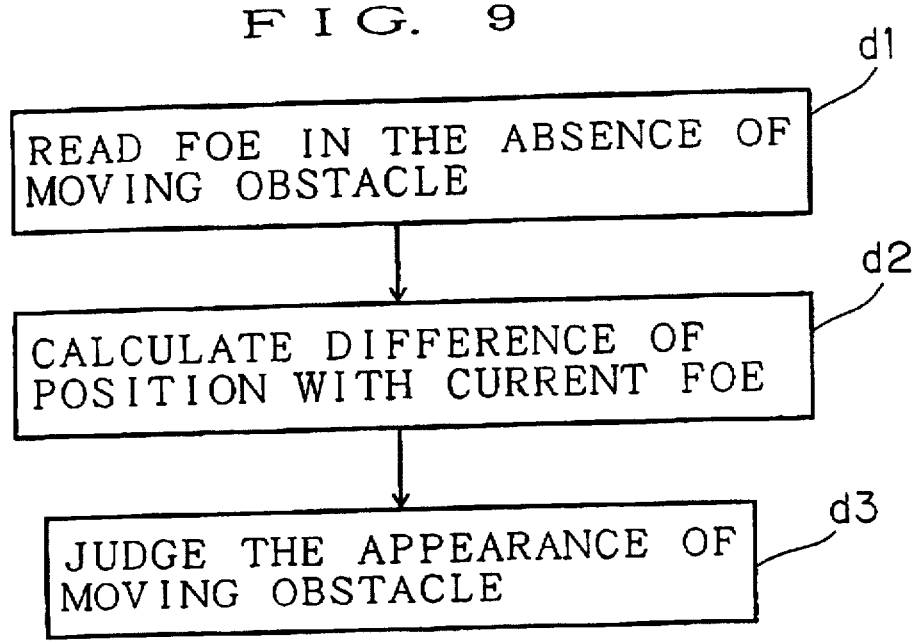
FIG. 9 is a flow chart of a moving obstacle detecting process.

FIG. 8 shows a typical detailed structure of the moving obstacle detecting unit 3. FIG. 9 shows a flow chart of a moving obstacle detecting process corresponding to the respective components of the unit 3, which corresponds to the flows at the steps a3 and a4 of FIG. 2.

An F.O.E. displacement calculating unit 17 reads an F.O.E. value $(X_{Fo}, Y_{Fo})$ in the absence of a moving obstacle, which is stored in the F.O.E. memory 16 (see step d1 of FIG. 9), and seeks a difference D between the read F.O.E. value and the position of the F.O.E. value $(X_F, Y_F)$ at the current moment (see step d2 of FIG. 9).

In practice, the following equation is calculated:

$$D = \sqrt{(XF - XFo)^2 + (YF - YFo)^2} \quad (6)$$

A moving obstacle appearance judging means 18 compares the displacement D with a predetermined threshold value and judges that a change occurred in F.O.E. value due to appearance of a moving obstacle if the displacement is larger than the threshold value (see step d3 of FIG. 9).

Thus, a specific example of the moving obstacle detecting device according to the first embodiment can be implemented by incorporating structures of the above-mentioned components into the structure of FIG. 1.

FIRST MODIFICATION

This invention is not limited into the above-mentioned embodiment.

Figure 10:
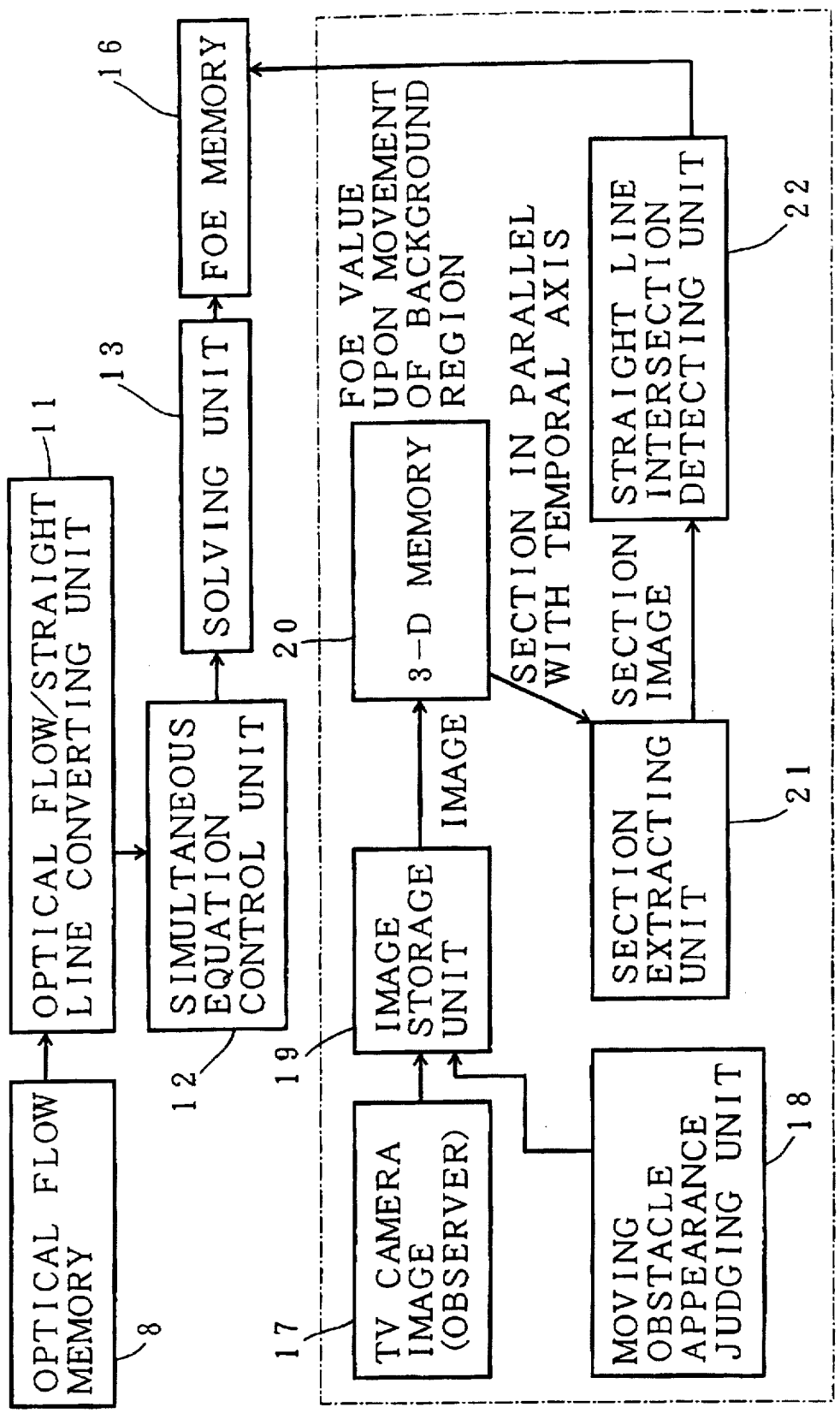
FIG. 10 is a modification of the F.O.E. calculating unit.

Though the F.O.E. calculating unit 2 of the first embodiment employs the optical flow-straight line converting unit 11, the simultaneous equation control unit 12 and the solving unit 13 to sequentially calculate the F.O.E. position, it may be supplemented with an image storage unit 19, a 3-dimension memory 20, a section extracting unit 21, and a straight line intersection detecting unit 22 as shown in FIG. 10 to improve the estimation of an F.O.E. value by the motion of the background in the absence of any moving obstacle with good precision.

The image storage unit 19 stores the images in the absence of any moving obstacle among the observer TV camera images into the 3-dimension memory 20 by employing the results of judgment by the moving obstacle appearance judging unit 18.

The section extracting unit 21 extracts a section in parallel with the time axis direction from the dynamic image sequence stored in the 3-dimension memory.

Figure 11:
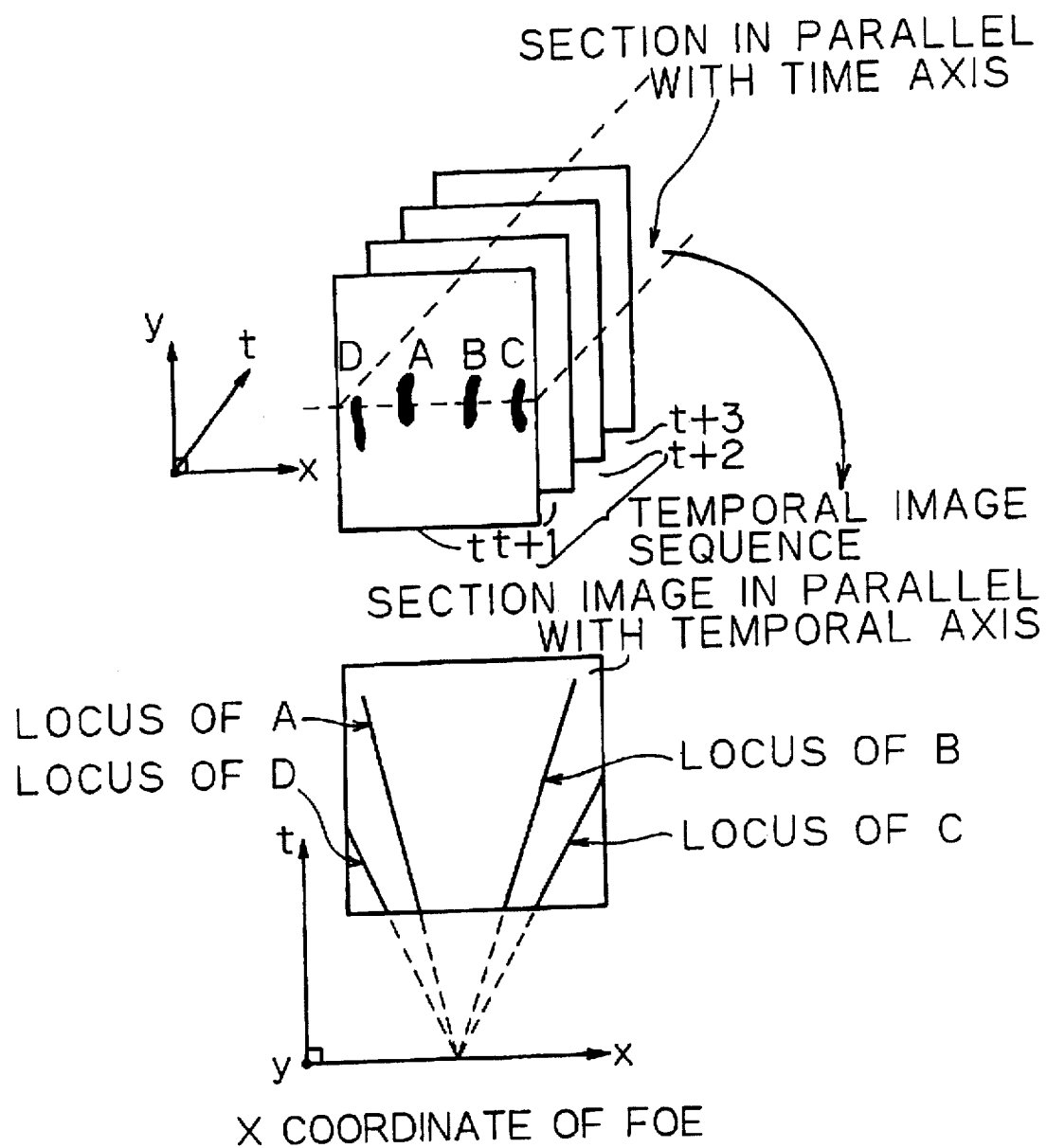
FIG. 11 shows loci of a background region in a section in parallel with a time axis.

The object standing still relative to the environment draws a locus of a straight line on the section, and the intersection becomes a horizontal position of the F.O.E. The vertical position of the F.O.E. needs not be estimated when the observer moves on a plane because it has the same value as that of the center of the image. This model is depicted in FIG. 11. As the section, a horizontal plane passing the center of images is selected. Assuming that the referenced marks A, B, C and D represent background regions in the respective images, the loci on the section become straight lines radially extending from the F.O.E., so that the X coordinate of the F.O.E. can be estimated by calculating the intersection of the straight lines.

The straight line intersection detecting unit 22 detects straight lines from the section image and obtains the intersection to estimate the X coordinate of the F.O.E. to be stored in the F.O.E. memory 16 together with the vertical position.

The F.O.E. displacement quantity is calculated in the F.O.E. displacement calculating unit 17 of the moving F.O.E. displacement calculating unit 3 using the following equation:

$$D = \sqrt{(XF - XFo)^2 + (YF - YFo)^2} \qquad (7)$$

When the observer includes a rotation movement, the F.O.E. position obtained from the optical flow of the background region moves in a horizontal direction but the vertical position does not change. When a moving obstacle appears, however, the vertical position of the F.O.E. also changes. Accordingly, the detection of the moving obstacle can be stably executed even in the presence of the rotation movement by calculating the displacement quantity using the following equation instead of the aforesaid equation:

$$D' = \sqrt{W_x(XF - XFo)^2 + W_y(YF - YFo)^2} \qquad (8)$$

wherein $W_x$ and $W_y$ represent weighting coefficients for the horizontal position change and vertical position change, respectively, of F.O.E. By setting $W_y$ to a sufficiently large value compared with $W_x$, the above-mentioned effect is ensured.

Thus, this invention can be implemented in various modes without departing from the scope of the invention.

SECOND EMBODIMENT

The second embodiment of this invention will be described hereinafter referring to FIGS. 12 to 24.

Figure 12:
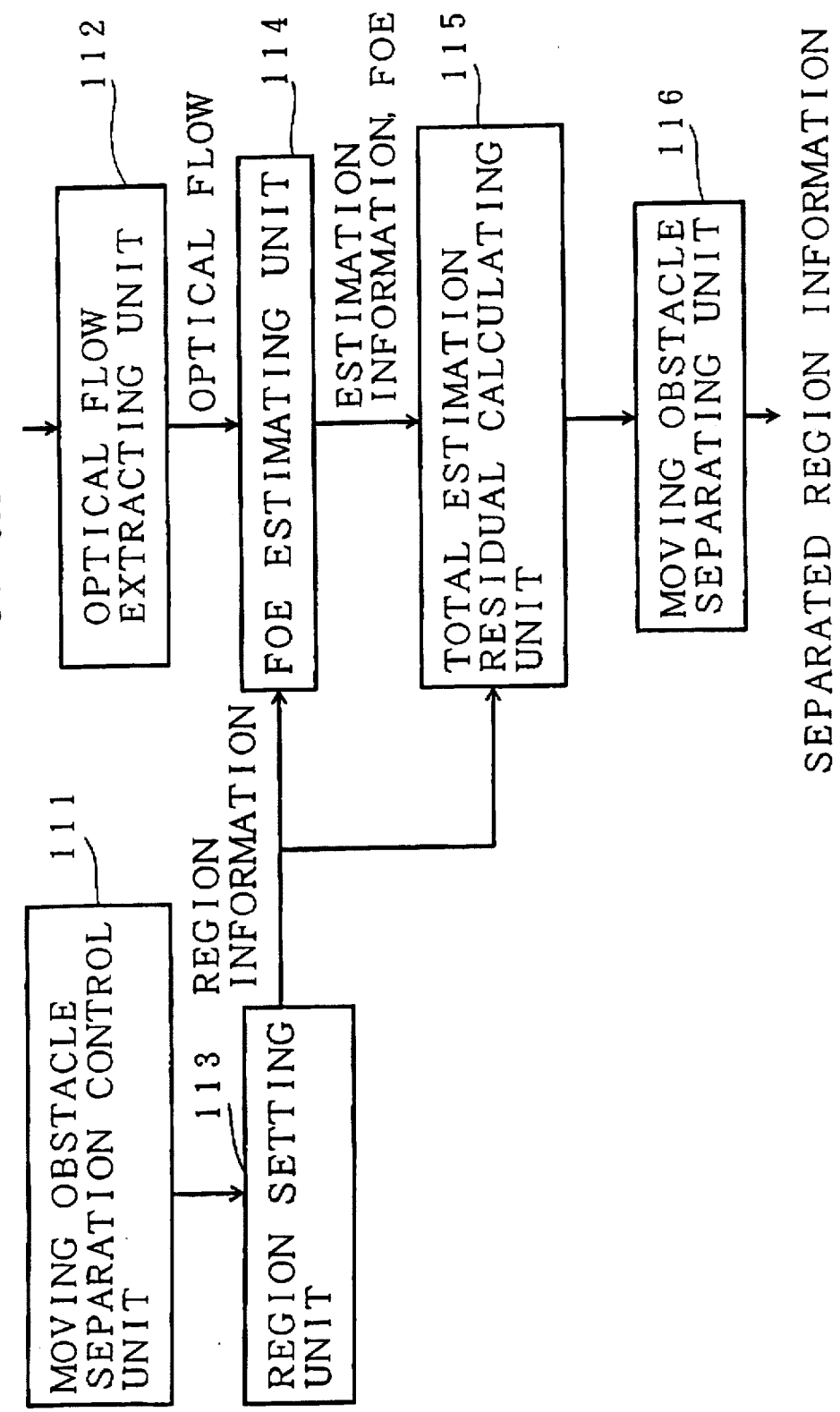
FIG. 12 is a schematic block diagram showing the overall structure of a second embodiment of this invention.
Figure 13:
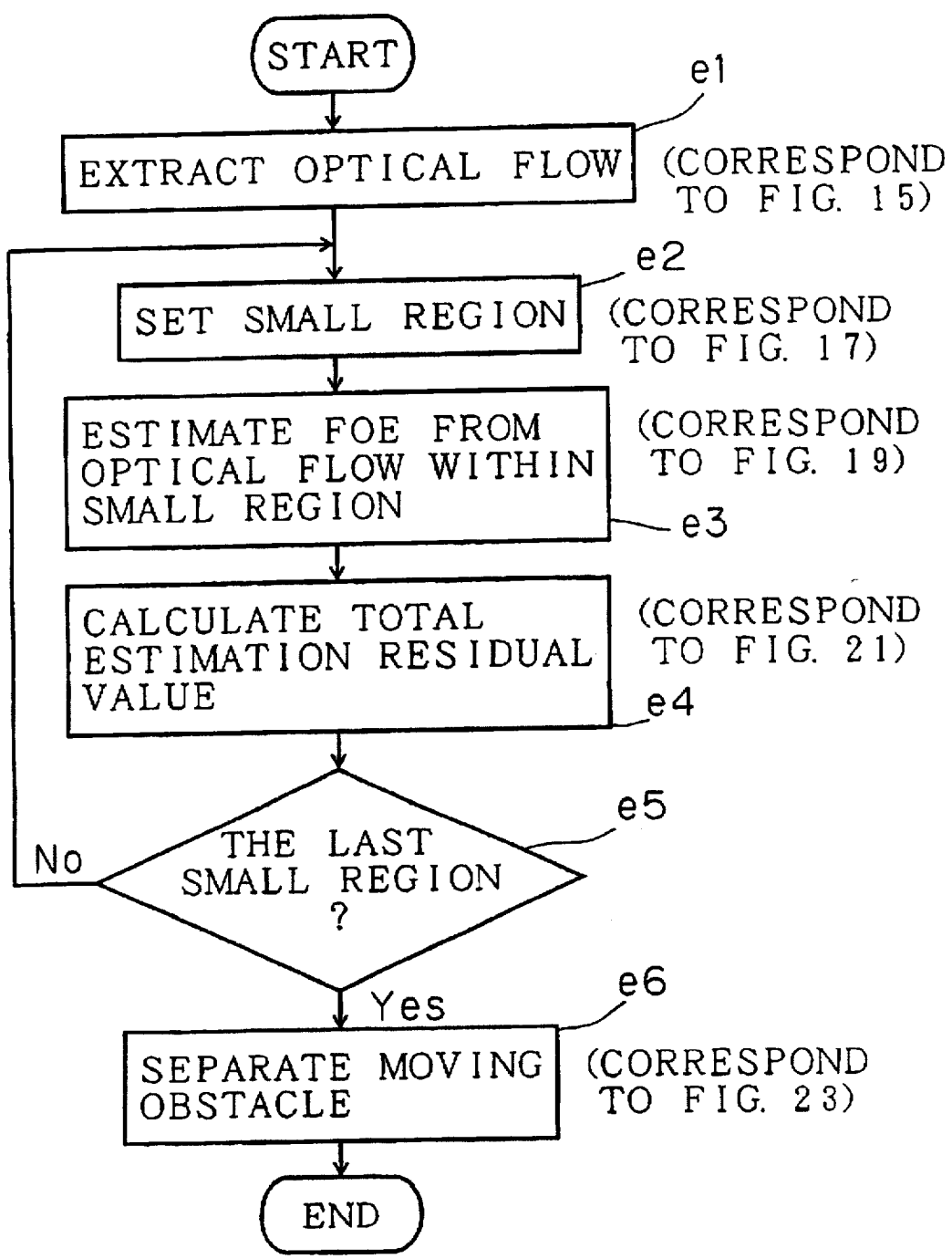
FIG. 13 is a flow chart of an operating process in the structure of FIG. 12.

FIG. 12 shows an overall structure of this embodiment, and FIG. 13 shows a flow chart of operations in the structure.

Assuming that an observer linearly moves in this embodiment, optical flows of a stationary background region in an environment exist on a straight line originating at one point (F.O.E.).

An optical flow extracting unit 112 analyzes a temporal change of the television camera image taken from the observer to extract optical flows representing the motion of a local region unit (see step e1 of FIG. 13).

A moving obstacle separating control unit 111 generates region control information to be sequentially applied to a region setting unit 113 so that a small region may cover a part or all of the image (on optical flows). Apart from the processing in a moving obstacle separating unit 116, the following process is executed for each small region set by the region setting unit 113.

In the region setting unit 113 a small region is set as a unit for estimating the F.O.E. based on the region control information transferred from the moving obstacle separating control unit 111 (see step e2 of FIG. 13).

An F.O.E. estimating unit 114 clips the optical flows obtained by the optical flow extracting unit 112 with the small region set in the region setting unit 113 to convert the optical flows within the small region into equations of straight lines, and resolves the equations in a simultaneous system to obtain an F.O.E. position as a projected point in the direction of straight forward movement of the observer (see step e3 of FIG. 13).

A total estimation residual calculating unit 115 calculates a residual value of F.O.E. estimation based on the F.O.E. estimated by the F.O.E. estimating unit 114 and the estimation parameters. Moreover, the optical flow within the region set by the region setting unit 113 is made constant using the estimated residual value and sequentially integrated region after region and stored (see step e4 of FIG. 13).

If the small region generated by the region setting unit 113 is the last small region, the integrated residual value of F.O.E. estimation is divided by the number of times of integration and stored as the total residual value of F.O.E. estimation (see step e5 of FIG. 13). An obstacle having an F.O.E. different from a background image exists near a point where the total residual value of F.O.E. estimation is large (FIG. 24A). In a moving obstacle separating unit 116, a moving obstacle region is separated by threshold value processing and the region information is stored (see step e6 of FIG. 13 and FIG. 24B). Only a background image exists at the point where the total residual value of F.O.E. estimation is small (see FIG. 24C). The above-mentioned region information is utilized as control information.

The respective components of this embodiment will be described in detail hereinafter.

[OPTICAL FLOW EXTRACTING UNIT 112]

In this embodiment, a plurality of spatiotemporal filter outputs are respectively subjected to constraint of a spatiotemporal gradient which is represented by:

$$\frac{\partial I}{\partial x} u + \frac{\partial I}{\partial y} v + \frac{\partial I}{\partial t} = 0 \qquad (9)$$

and an optical flow is obtained by solving the following equation:

$$A \cdot v + I_t = 0 \quad \text{where} \quad A = \begin{bmatrix} I_{1x} & I_{1y} \\ I_{2x} & I_{2y} \\ \cdot & \cdot \\ \cdot & \cdot \\ I_{nx} & I_{ny} \end{bmatrix}, I_t = \begin{bmatrix} I_{1t} \\ I_{2t} \\ \cdot \\ \cdot \\ I_{nt} \end{bmatrix} \qquad (10)$$

wherein $I_{ix}$ represents a differential coefficient of the "i"th spatiotemporal filter output and $v=(u, v)^T$ represents an optical flow to be found. Here EQUATION 10 is modified to the solving equation $$[A|I_t]\begin{bmatrix} v \\ 1 \end{bmatrix} = 0 \qquad (11)$$

and the measurement matrix $[A|I_t]$ on the left side is subjected to singular value decomposition for estimation by the following equation:

$$v = -(A^T A - \lambda_3^2 I)^{-1} A^T I_t \qquad (12)$$

wherein $\lambda_3$ represents the minimum singular value in the measurement matrix.

The spatiotemporal filter is a separable filter. For the spatial direction, a filter utilizing the product of a Gaussian function multiplied by a linear or quadratic differential function in the orthogonal direction and an LOG (Laplacian Of Gaussian) filter are employed. The temporal filter is a Gaussian (one-half from the peak) filter.

The estimation is executed using a plurality of scales independently. With a constraint set to the ratio of singular values $\lambda_3/\lambda_2$, the result obtained on the proper scale is weighted with its reciprocal and a re-estimation is made using equation 12.

Figure 14:
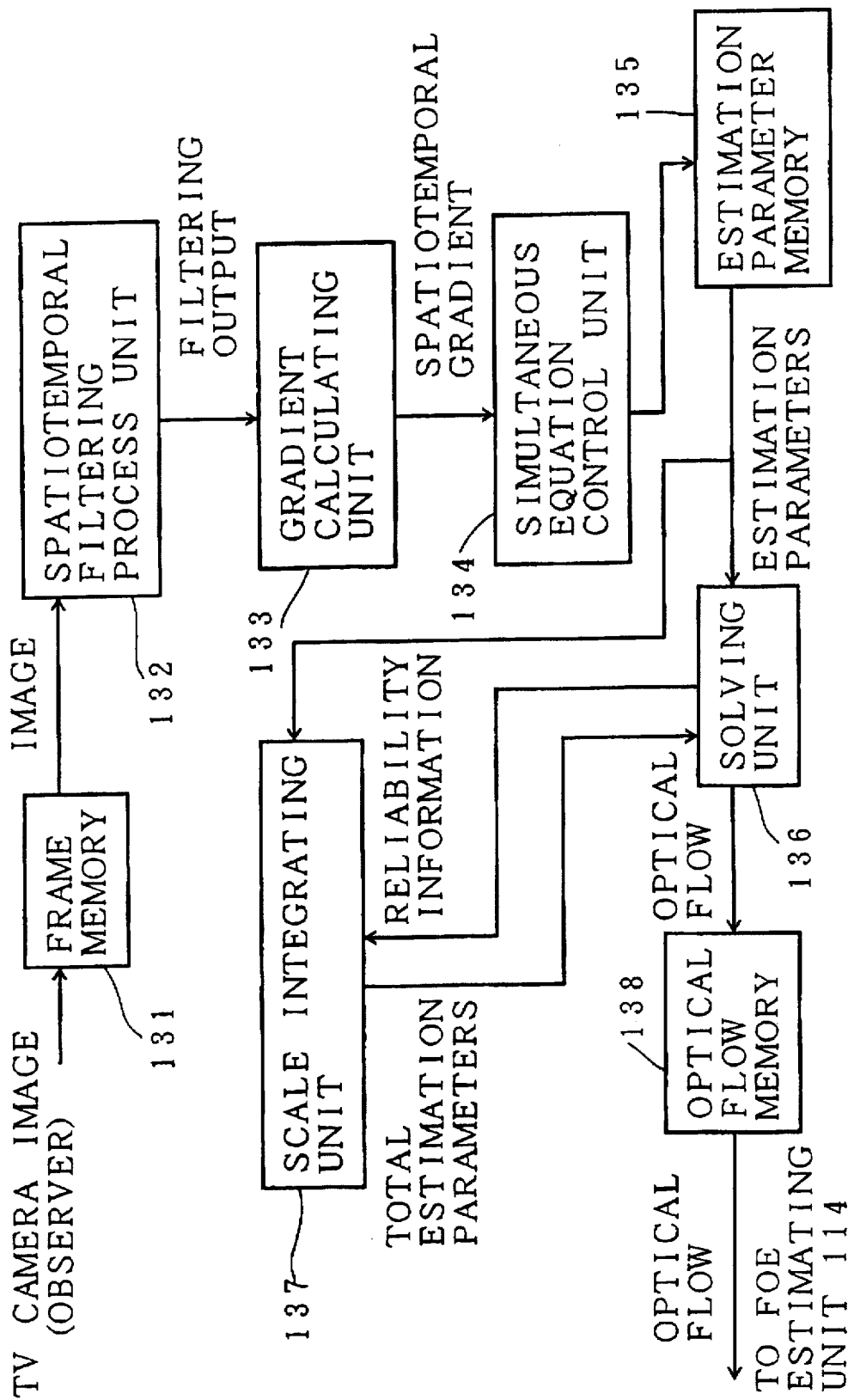
FIG. 14 shows a typical structure of an optical flow extracting unit.

The structure of the optical flow extracting unit 112 will be described in conjunction with FIG. 14. The flow chart of an optical flow extracting process corresponding to the components of this structure is shown in FIG. 15.

A frame memory 131 stores images sequentially picked up by a TV camera.

A spatiotemporal filtering process unit 132 filters the images stored in the frame memory 131 using the above-mentioned spatiotemporal filter. This filtering process is executed at two instants (see step f1 of FIG. 15).

Figure 15:
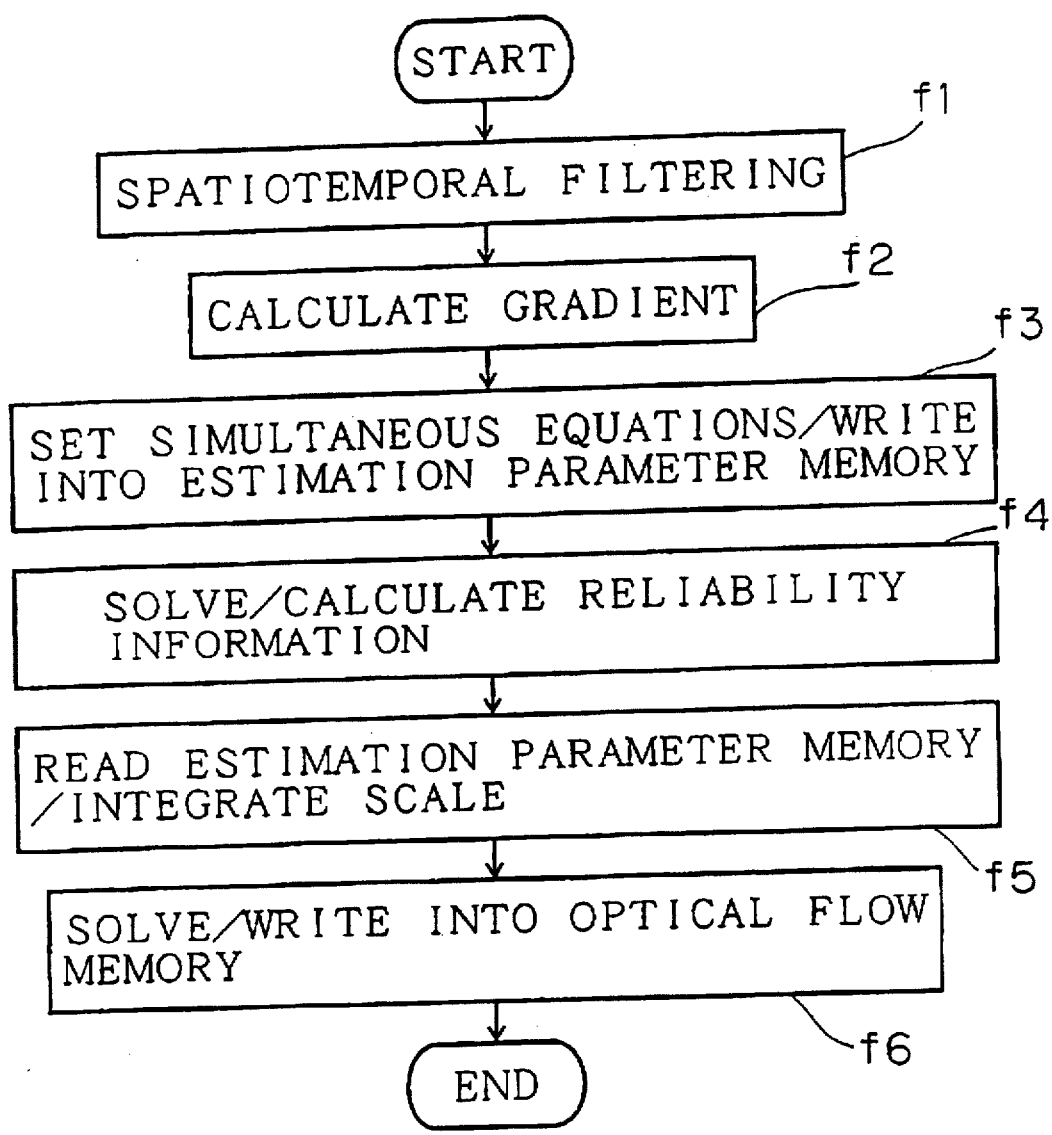
FIG. 15 is a flow chart of an optical flow extracting process.

A gradient calculating unit 133 calculates a spatial gradient and a temporal gradient of each filter output to be applied to a simultaneous equation control unit 134 (see step f2 of FIG. 15).

The simultaneous equation control unit 134 finds the matrix A and vector $I_r$ of equation 10 for the gradients of respective filter outputs for storage in an estimation parameter memory 135 (see step f3 of FIG. 15).

A solving unit 136 makes an estimation for each scale using the equation 12. The result of estimation thus obtained and the value $\lambda_3/\lambda_2$ are applied to a scale integrating unit 137. Then, a reestimation according to equation 12 is made using the integrated estimation parameter (A, $I_r$) from the scale integrating unit 137. The result of reestimation is written into an optical flow memory 138 (see step f4 of FIG. 15).

The scale integrating unit 137 executes a threshold value processing using the value $\lambda_3/\lambda_2$ supplied from the solving unit 136 and the speed domain which is determined by the scale of the filter, excludes scales of low reliability, and integrates the equation 10 of each scale from the estimation parameters (see step f5 of FIG. 15). The result of integration is applied to the solving unit 136 (see step f6 of FIG. 15).

[REGION SETTING UNIT 113]

Figure 16:
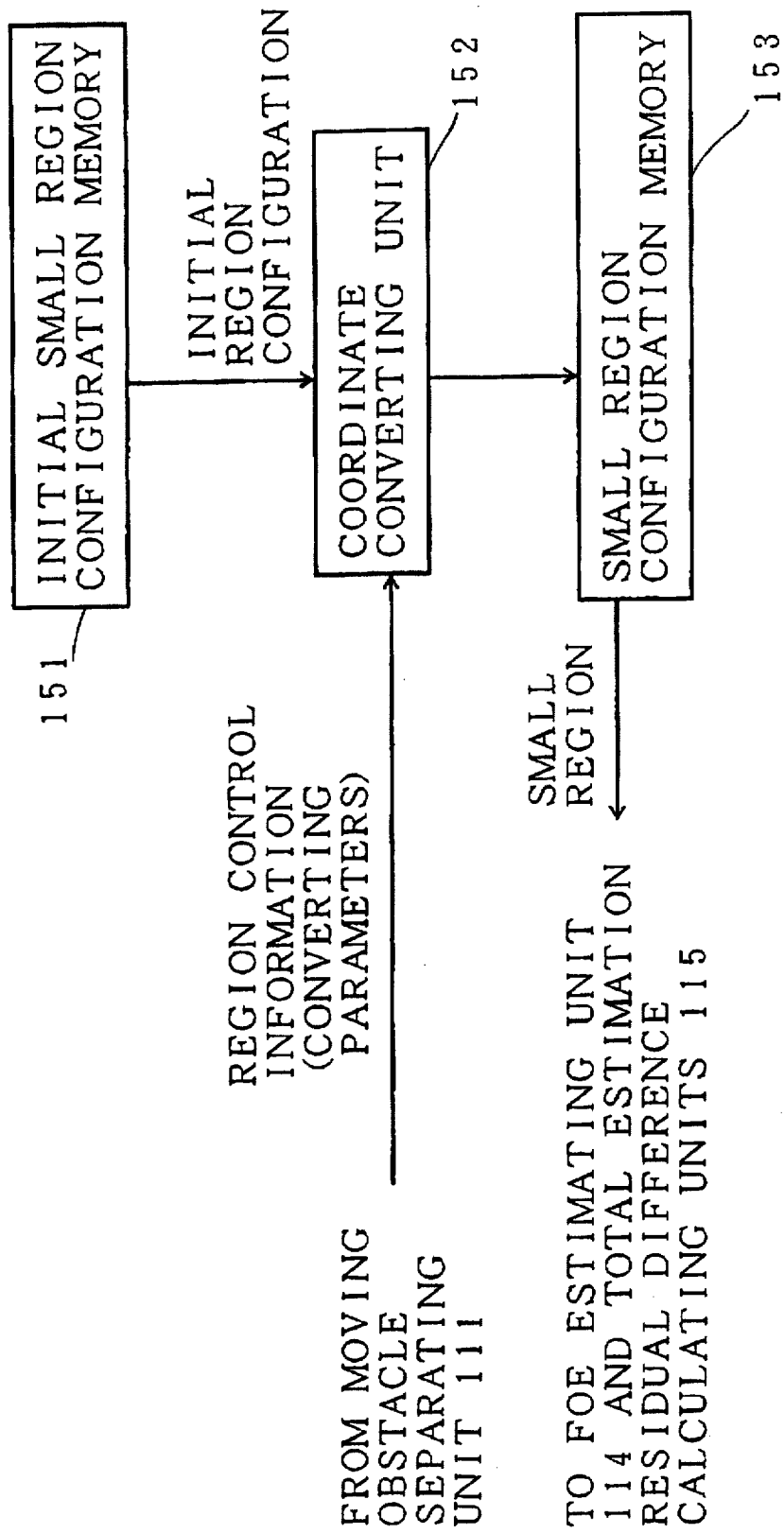
FIG. 16 shows a typical structure of a region setting unit.
Figure 17:
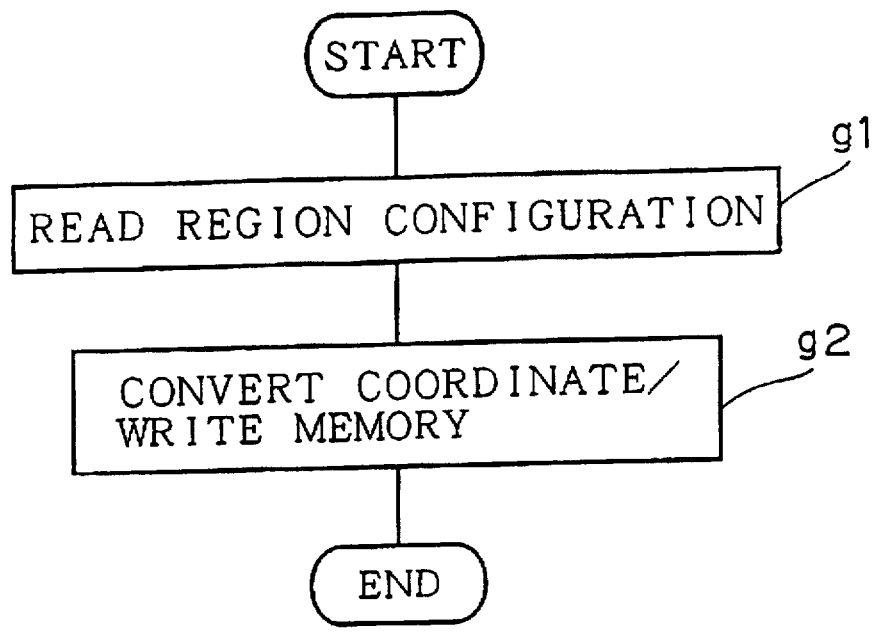
FIG. 17 is a flow chart of a region setting process.

FIG. 16 shows a specific example of the region setting unit 113, and its flow chart is shown in FIG. 17.

The region setting unit 113 sequentially sets a small region based on the region control information transmitted from the moving obstacle separating control unit 111.

An initial small region configuration memory 151 stores a predetermined region configuration such as a block.

A coordinate converting unit 152 reads out said initial small region configuration stored in initial small region configuration memory 151 (see step g1 of FIG. 17), executes a coordinate transformation using the region control information (coordinate converting parameters) from the moving obstacle separation control unit 111 and writes the result into a small region configuration memory 153 (see step g2 of FIG. 17).

[F.O.E. ESTIMATING UNIT 114]

Figure 18:
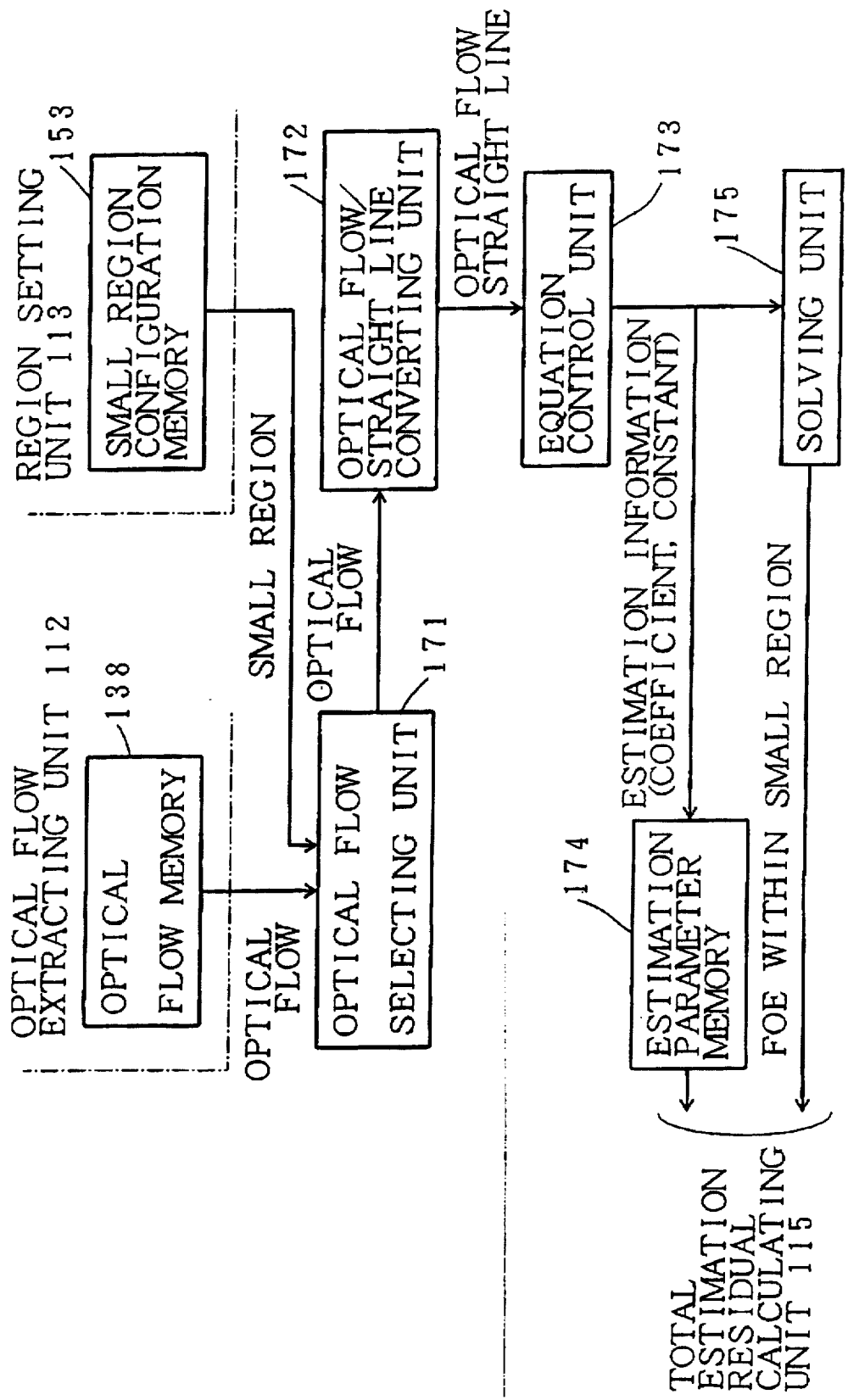
FIG. 18 shows a typical structure of an F.O.E. estimating unit.
Figure 19:
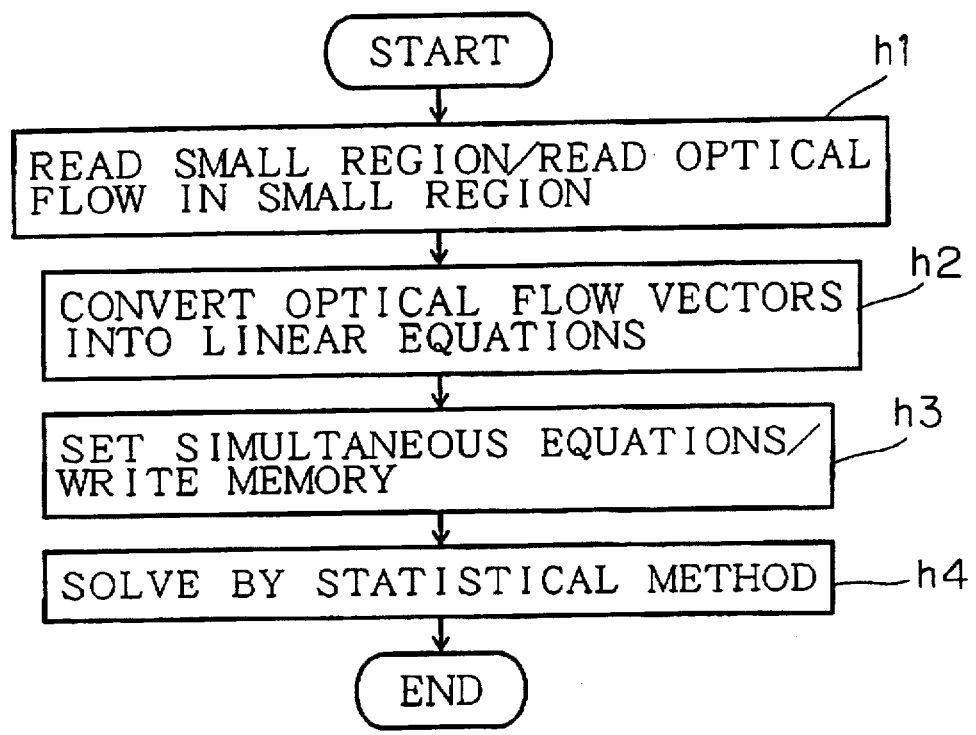
FIG. 19 is a flow chart of an F.O.E. estimating process.

FIG. 18 shows a specific architecture of the F.O.E. estimating unit 114, and FIG. 19 shows a flow chart corresponding to the respective components of the unit.

An optical flow selecting unit 171 reads region configuration data from said small region configuration memory 153 and small region optical flow data from an optical flow memory 138 and feeds the data to an optical flow/straight line converting unit 172 (see step h1 of FIG. 19).

The optical flow/straight line converting unit 172 calculates the linear equations of optical flows from the respective optical flow vectors obtained from the optical flow selecting unit 171 (see step h2 of FIG. 19).

Assuming that an optical flow vectors ($u_i$, $v_i$) are obtained at point ($x_i$, $y_i$), the following equation is given for the straight line:

$$a_i x + b_i y + c_i = 0 \tag{13}$$

wherein $$a_i = y_i$$

$$b_i = x_i \tag{14}$$

$$c_i = y_i(x_i + u_i) + x_i(y_i + v_i)$$

equation control unit 173 sets the coefficient matrix A and constant vector c of simultaneous equations to find an intersection of the above-mentioned straight lines (see step h3 of FIG. 19). The matrix and constant vector are transferred to a solving unit 175 and an estimation parameter memory 174 for storage. The coefficient matrix A and constant vector c are given by the following equations. The symbol n represents the number of optical flow vectors:

$$A = \begin{bmatrix} a_1 & b_1 \\ a_2 & b_2 \\ \cdot & \cdot \\ \cdot & \cdot \\ \cdot & \cdot \\ a_n & b_n \end{bmatrix} \tag{15}$$

$$c = [c_1\ c_2\ \ldots\ c_n]^T \tag{16}$$

Based on the coefficient matrix and constant vector, the solving unit 175 (see step h4 of FIG. 19) seeks the optimal solution $\tilde{x} = (\tilde{x}, \tilde{y})^T$ to the following equation by employing a numerical calculation method such as SVD (singular value decomposition):

$$A\tilde{x} + c = o \tag{17}$$

[GLOBAL ESTIMATION RESIDUAL CALCULATING UNIT 115]

Figure 20:
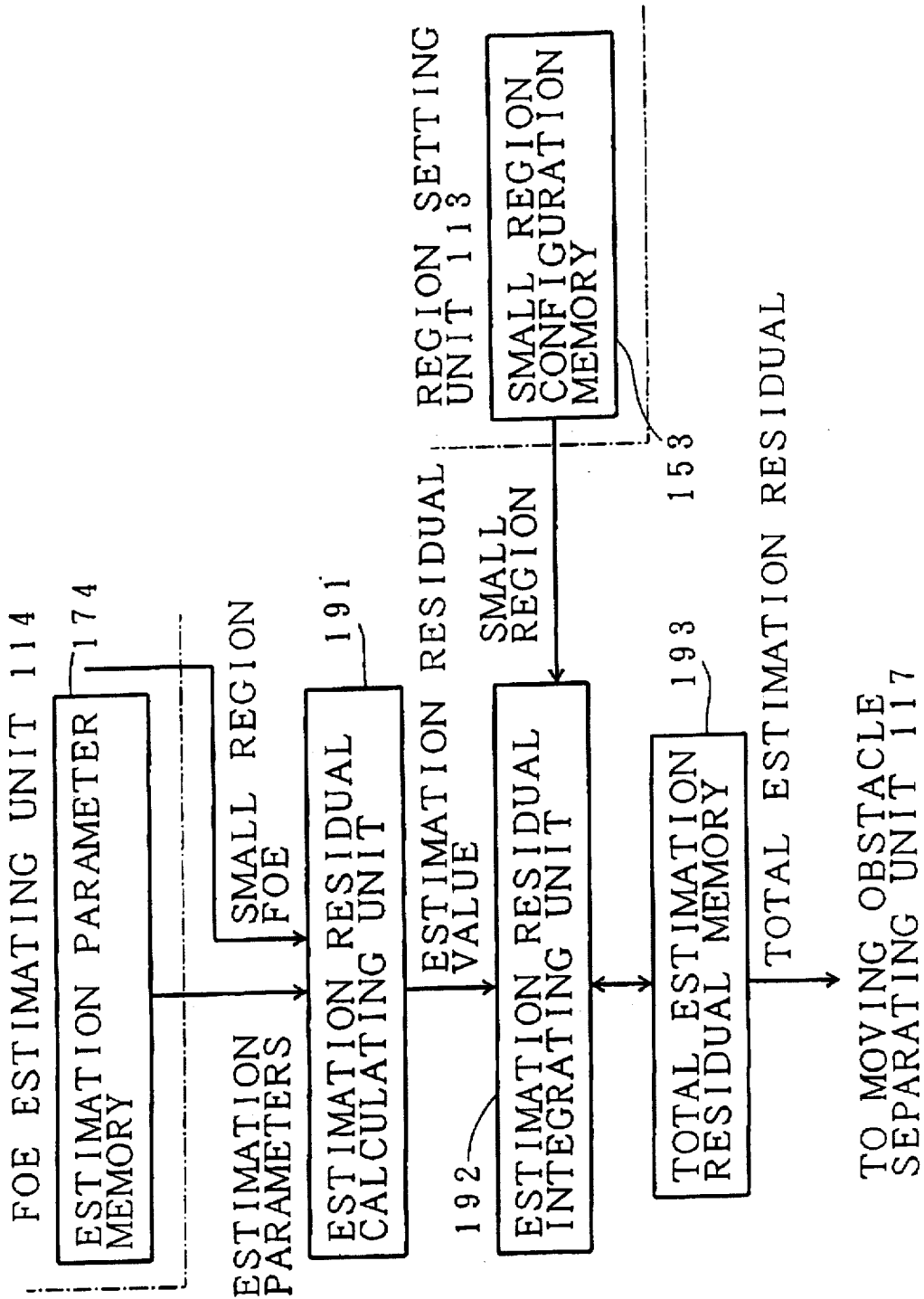
FIG. 20 shows a typical structure of a total residual value of F.O.E. estimation calculating unit.
Figure 21:
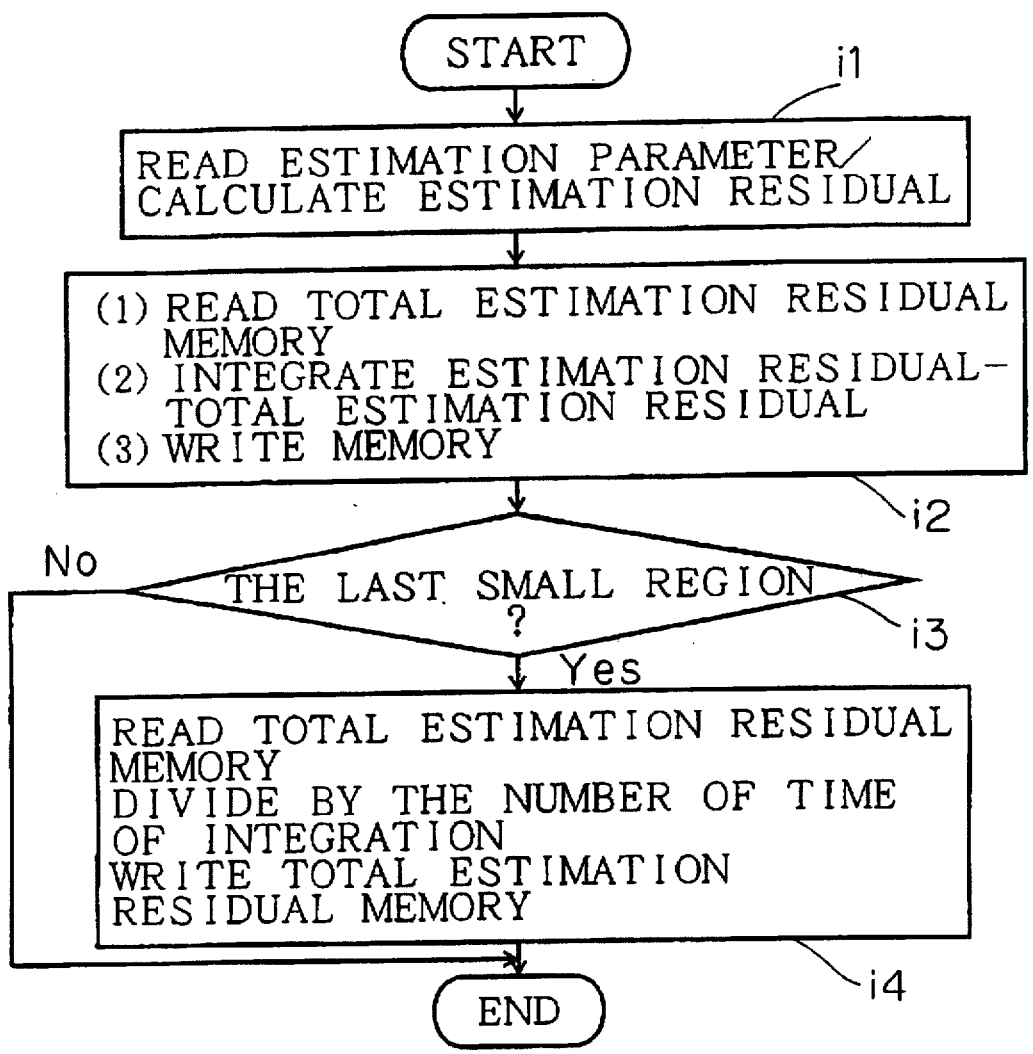
FIG. 21 is a flow chart of a total residual value of F.O.E. estimation calculating process.

FIG. 20 shows a typical total estimation residual calculating unit 115, and FIG. 21 shows the relevant processing flow.

An estimation residual calculating means 191 calculates the residual value in the estimation of F.O.E. from the optical flow within a small region based on the result of estimation $\tilde{x}$, A and vector c in the F.O.E. estimating unit 114 (see step i1 of FIG. 21), as follows.

$$\|A\tilde{x} + c\| \tag{18}$$

(1) An estimation residual integrating unit 192 reads the region configuration from the small region configuration memory 153 and has the inside of the region made constant with the residual value of F.O.E. estimation for addition and storage in a total estimation residual memory 193. The structure of the memory 193 corresponds to the coordinates of the original image, and is initialized to 0 on initiation of the flow.

As it is the case with the method employed in the optical flow extracting unit 112 of this embodiment, there would be a significant difference in the F.O.E. estimation residual due to a difference in the number of optical flows within the small region should there exist points where the optical flow is not extracted. In such cases, the residual value of F.O.E. estimation is divided by the number (n) of optical flows and the quotient is used as the residual value of F.O.E. estimation.

(2) Integration is executed for each small region. As a result, when there is a spatial common region, the residual value of F.O.E. estimation is integrated within the common region.

(3) The number of times of the integration is stored in the total estimation residual memory 193 as additional information (see step i2 of FIG. 21).

After integrating the residual value of F.O.E. estimation for all small regions (see step i3 of FIG. 21), the integration result is divided by the number of times of integration at each point for storage into the memory 193 (see step i4 of FIG. 21). However, when the number of times of integration is 0, 0 is written into the memory. The result is referred to as the total residual value of F.O.E. estimation.

Total residual value of F.O.E. estimation is distributed in three dimensions corresponding to the sets of small region distributed in two dimensions within the image.

[MOVING OBSTACLE SEPARATING UNIT 116]

Figure 22:
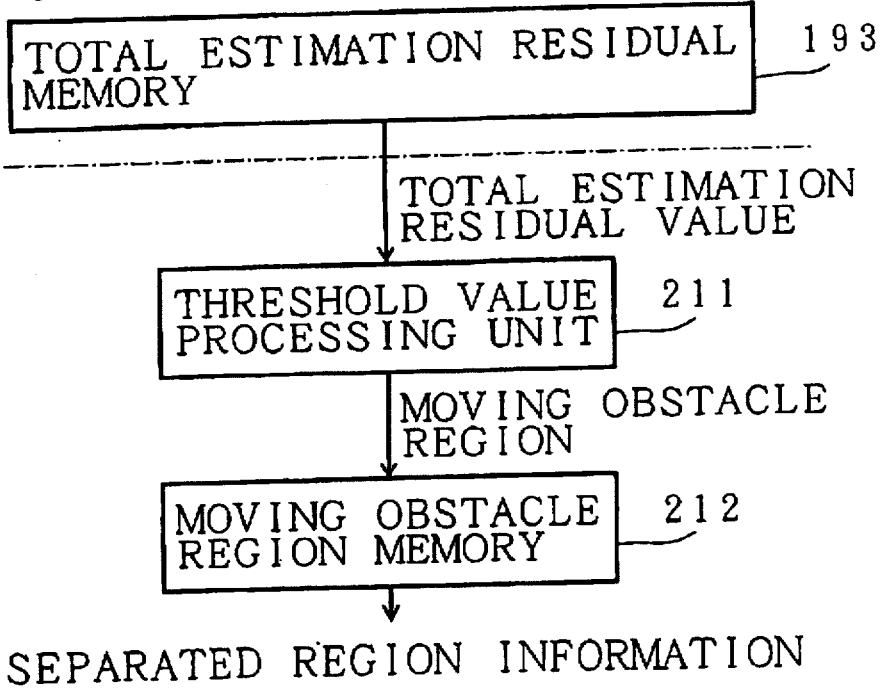
FIG. 22 shows a typical structure of a moving obstacle separating unit.
Figure 23:
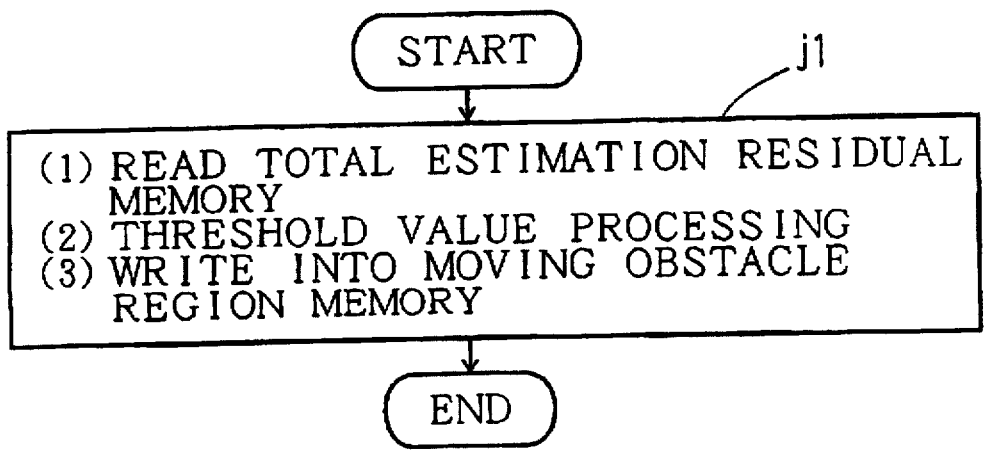
FIG. 23 is a flow chart of a moving obstacle separating process.

FIG. 22 shows a specific example of moving obstacle separating unit 116, and FIG. 23 shows a flow chart of the process in the structure.

When a moving obstacle exists on an image (see FIG. 24A), there exists an optical flow having a different F.O.E. in the small region (see FIG. 24B). Accordingly, the total residual value of F.O.E. estimation on the moving obstacle or its peripheral becomes large in comparison with that of the background (see FIG. 24C). As a result, the separation of the moving obstacle from the background image is enabled by threshold-value processing of the total residual value of F.O.E. estimation.

A threshold value processing unit 211 reads the total residual value of F.O.E. estimation from the total estimation residual memory 193 and stores into a moving obstacle region memory 212 the region satisfying the following equation for the threshold value $t_h$ as a moving obstacle region (see step j1 of FIG. 23):

$$e_{all} > t_h \quad (19)$$

Where $e_{all}$ represents the total residual value of F.O.E. estimation read from the memory 193.

This moving obstacle region information is used as control information in the recognition processing section for moving obstacle recognition.

SECOND MODIFICATION

Though, in the above-mentioned embodiments, the observer is assumed to move in a linear motion and a TV camera as the observer is assumed to be non-vibrating, the motion of the TV camera includes a rotation component because of its vibration. This rotation component must be removed. A method for removing such rotation component will be described hereinafter.

Figure 25A:
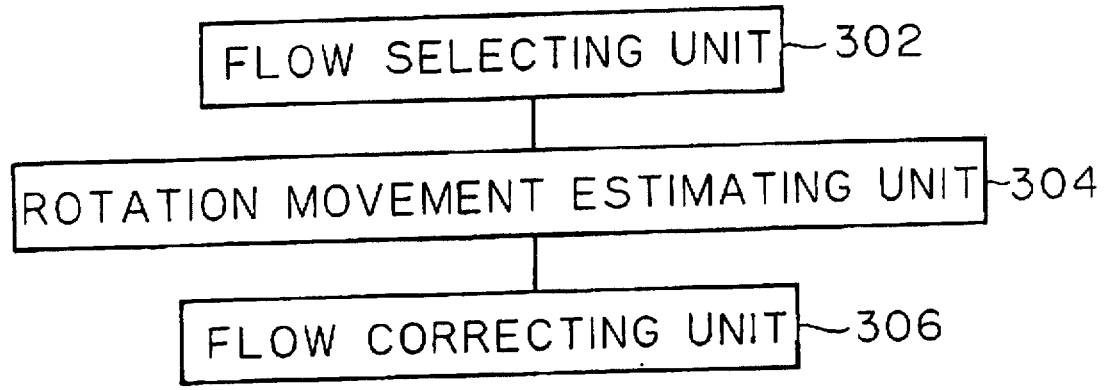
FIGS. 25A and 25B show a schematic block diagram of a rotation component removing unit and a principle of a method for sensing a road surface in a modification.

FIG. 25A shows a rotation component removing unit 300 comprising a flow selecting unit 302, a rotation component estimating unit 304, and a flow correcting unit 306.

The flow selecting unit 302 selects a plurality of flow vectors from the region other than a moving obstacle in an image.

For this extraction of the region other than the moving obstacle in the image, the road surface region obtained by a road surface detecting method as shown in the following example is employed.

The ratio $\lambda_3/\lambda_2$ of singular values ($\lambda_1 \geq \lambda_2 \geq \lambda_3 \geq 0$) obtained by singular value decomposition of the measurement matrix of the EQUATION 11 is a measure of reliability, and vectors having small values, viz. high reliability, are selected.

Figure 25B:
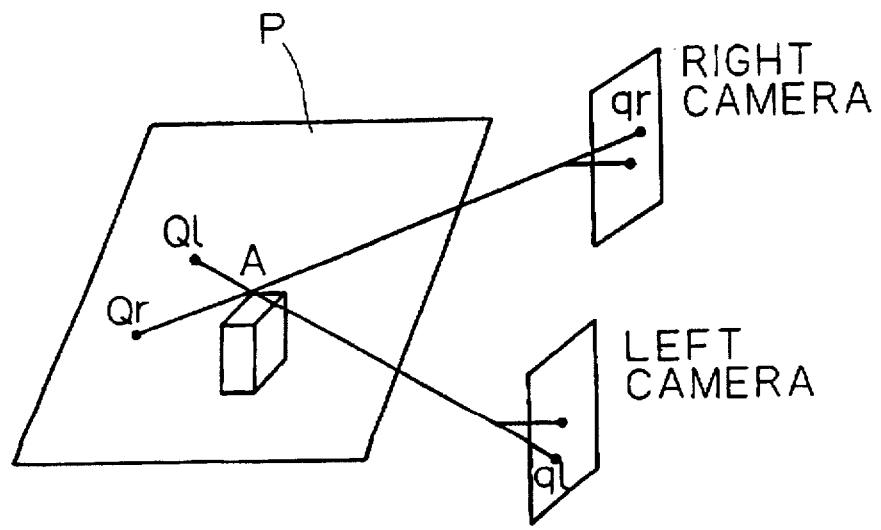
Figure 26:
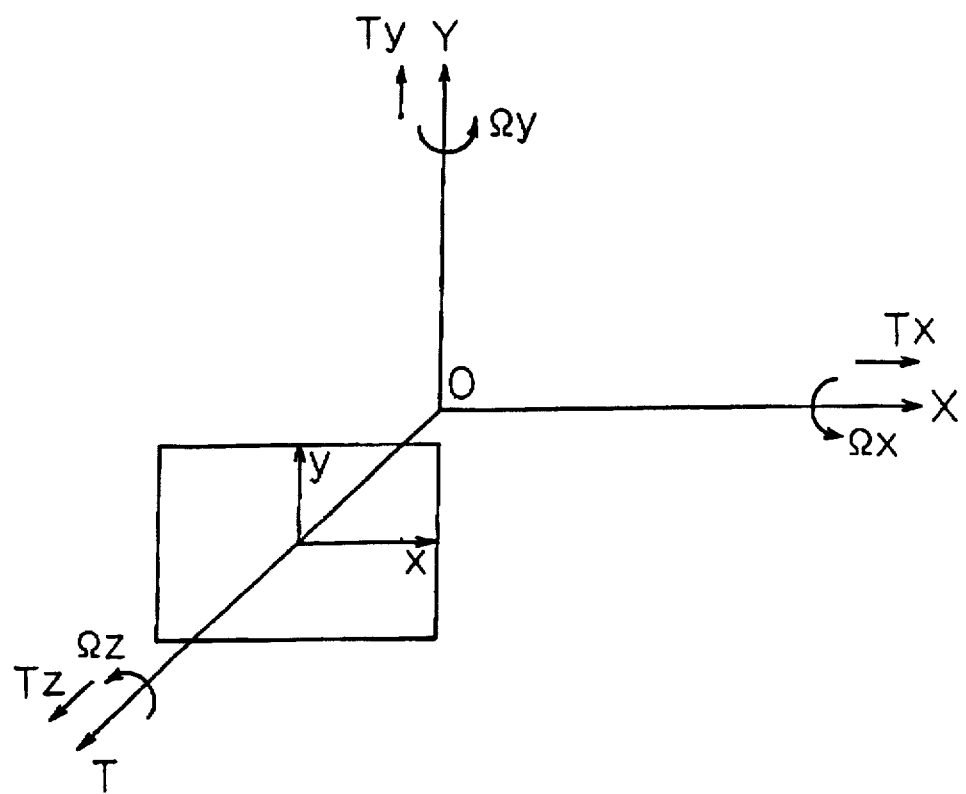
FIG. 26 is illustration of an observer.

FIG. 25B shows the principle of the road surface detecting method.

According to this method, a couple of cameras are employed, and a plane (road surface) ahead of the cameras is detected, assuming that the road surface is flat and the relation between road surface and cameras is known in advance. One of the cameras doubles as the camera for flow extraction.

At first, an image is picked up by synchronized stereo cameras.

Then, in a computer, the respective right and left camera images are projected on a road surface simulation plane by utilizing the relation of the respective cameras with the road surface.

The respective points on the road surface in the right and left camera images generally coincide on the projected image, and any point not existing on the road surface does not coincide.

Therefore, when the difference between the right and left projected images is traced, the pixel value of a point on the road surface is small while the pixel value of a point not existing on the road surface is large. Thus, by choosing a region having a small pixel value, a road surface region can be extracted.

In practice, it may happen that the picked-up image has a region where no texture exists so that the pixel value of a region other than the road surface is also small. Therefore, the road surface (plane) ahead of the cameras is extracted by utilizing the profile of the boundary between the road surface and any object located at a different elevation and radially seeking the boundary from the visual point on the projection plane.

A rotation movement estimating unit 304 estimates the revolution of the camera using the flow vectors obtained from the flow selecting unit 302. Considering a coordinate system (camera coordinate system) as shown in FIG. 1, the following equation holds when a spatial point $P_i:(X_i, Y_i, X_i)$ is projected on a point $p_i:(x_i, y_i)$ on the image pickup plane by central projection:

$$x_i = f\frac{X_i}{Z_i}, y_i = f\frac{Y_i}{Z_i} \quad (20)$$

wherein f represents the focal length of the camera.

When the point $P_i$ moves relatively to the cameras by translation movement $T=(T_x, T_y, T_z)^T$ and rotary movement $\Omega=(\Omega_x, \Omega_y, \Omega_z)^T$, the relative movement of the point Pi is expressed as below:

$$\frac{dP_i}{dt} = \Omega \times P_i + T \quad (21)$$

and the optical flow $v_i=(u_i, v_i)^T$ at the point $(x_i, y_i)$ on the imaging pickup plane is expressed by $$\begin{bmatrix} u_i \\ v_i \end{bmatrix} = \begin{bmatrix} \frac{fT_x - x_iT_z}{Z_i} - \frac{x_iy_i}{f}\Omega_x + \left(f + \frac{x_i^2}{f}\right)\Omega_y - y_i\Omega_z \\ \frac{fT_y - y_iT_z}{Z_i} - \left(f + \frac{y_i^2}{f}\right)\Omega_x + \frac{x_iy_i}{f}\Omega_y + x_i\Omega_z \end{bmatrix} \quad (22)$$

Therefore, the rotary movement $\Omega=(\Omega_x, \Omega_y, \Omega_z)^T$ is obtained by using the flow vectors selected by the flow selecting unit 302 and solving the above equation in a simultaneous system.

A flow correcting unit 306 uses the rotary motion values estimated by the rotation movement estimating unit and removes the components associated with the rotary motions of the cameras from all flow vectors.

Assuming that the rotary motion estimated by the rotation movement estimating unit is $\Omega'=(\Omega'_x, \Omega'_y, \Omega'_z)^T$ a correction quantity $\Delta_i$ of a flow on a point $P_i:(x_i, y_i)$ is expressed by $$\Delta_i = -\begin{bmatrix} -\frac{x_iy_i}{f}\Omega_x + \left(f + \frac{x_i^2}{f}\right)\Omega_y - y_i\Omega_z \\ -\left(f + \frac{y_i^2}{f}\right)\Omega_x + \frac{x_iy_i}{f}\Omega_y + x_i\Omega_z \end{bmatrix} \quad (23)$$

and the flow vector $v'_i$ after correction is expressed by $$v'_i = v_i + \Delta_i \quad (24)$$

If the optical flow extracting unit 1 uses the flow vector v'i, the optical flow in which a rotary component is removed can be calculated.

THIRD EMBODIMENT

Referring to FIGS. 27 to 35, a third embodiment of this invention will be described hereinafter.

Figure 27:
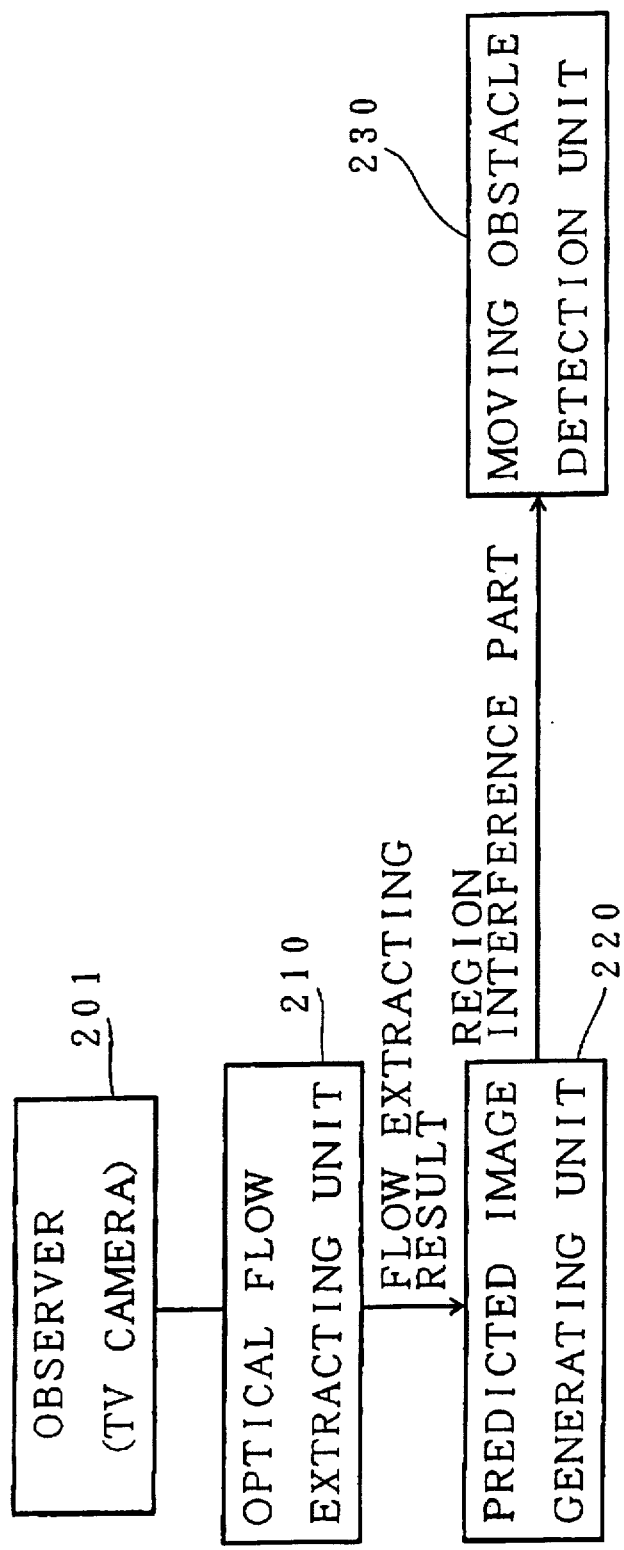
FIG. 27 is a schematic block diagram showing the overall structure of a third embodiment of this invention.

FIG. 27 shows a schematic block diagram showing the overall structure of a system of this embodiment, which includes an observer 201, an optical flow extracting unit 210, a predicted image generating unit 220, and a moving obstacle detection unit 230. The observer 201 is constituted with a TV camera and so forth, takes in images of an object to be measured, and sequentially generates image information.

The optical flow extracting unit 210 obtains a temporal image sequence from the TV camera of the observer 201, analyzes a temporal change of the images to extract an optical flow representing a motion of a local region unit. The observer of this embodiment is assumed to move linearly, and the optical flows of a background region standing still relative to the environment exist on straight lines originating at one point (F.O.E.).

In the predicted image generating unit 220, the image is divided in advance into a predetermined size unit to provide a plurality of partial regions, a position prediction at the next instant is performed by a partial region unit centered at a point where optical flows are obtained in the partial regions, and an image reflecting the position prediction results is generated as a predicted image.

The moving obstacle detecting unit 230 extracts a portion overlapped by a plurality of regions on the predicted image generated by the generating unit 220 to detect a region shielded by the moving obstacle in the background region, whereby the existence of the moving obstacle is detected. In other words, the detecting unit 230 has a function for detecting the presence of a moving obstacle by learning that the background region of said predicted image has a region shielded by the moving obstacle.

Figure 28:
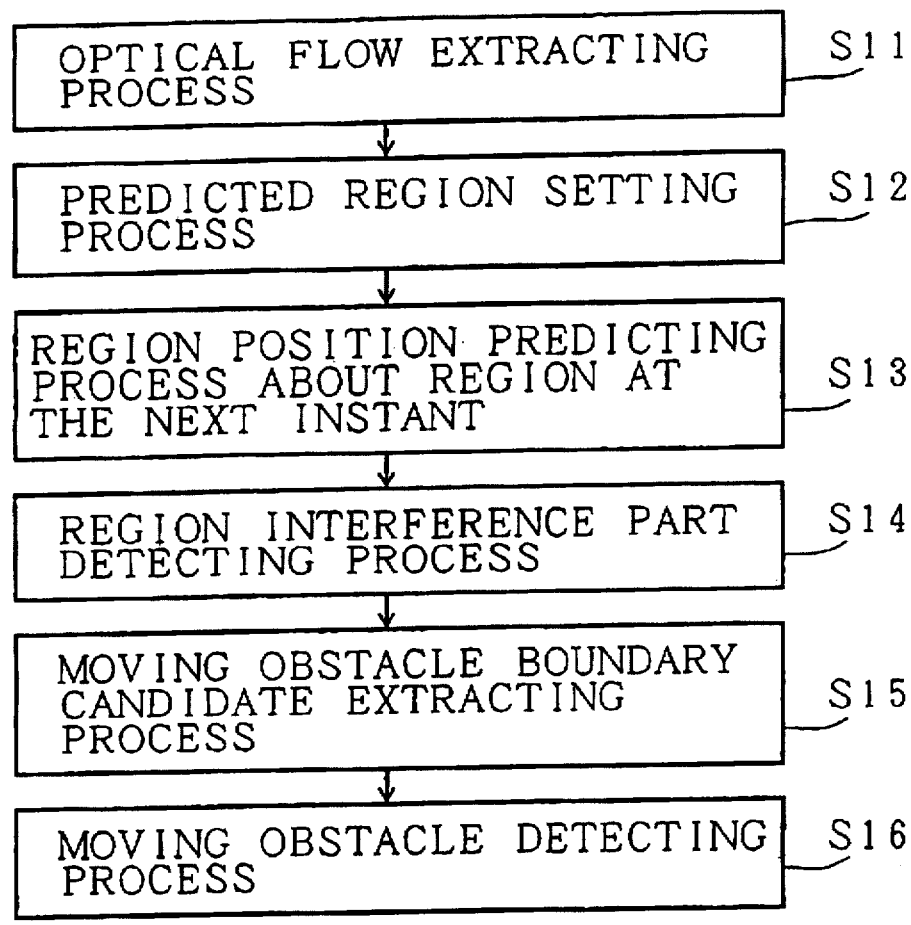
FIG. 28 is a flow chart of an operation in the structure of FIG. 27.

FIG. 28 shows a chart of the processing flow corresponding to information flowing in the components of FIG. 27. An operation of this system will be described hereinafter in conjunction with FIG. 28.

The observer 201 takes in images of an object to be observed and sequentially generates image information to be inputted into the optical flow extracting unit 210. The unit 210 sequentially obtains the image information from the observer 201, and analyzes temporal variations of the sequentially obtained images to detect optical flows which are movement of local region unit in the images (optical flow extracting process (step S11)).

In this embodiment, the observer 201 is assumed to move linearly, and the optical flows of a background region standing still relative to the environment exist on straight lines originating at one point (F.O.E.).

In the predicted image generating unit 220, the image is divided into partial regions centered at the point where optical flows are obtained (predicted region setting process (step S12)), the position prediction of the region at the next instant is performed by the divided partial region unit, and a predicted image is generated from the results of the prediction (region position predicting process about region at the next instant (step S13)).

The moving obstacle detecting unit 230 extracts a portion overlapped by a plurality of regions on the predicted image (region interference part detecting process (step S14)), and detects a region shielded by the moving obstacle in the background region (moving obstacle boundary candidate extracting process (step S15)). The existence of the moving obstacle is known if the background region has a region shielded by the moving obstacle (moving obstacle detecting process (step S16)).

Thus, the optical flows in the images sequentially obtained from the observer enables the detection of a moving obstacle when the moving obstacle is picked up by the observer.

The respective components of this device will be described in detail hereinafter.

Figure 29:
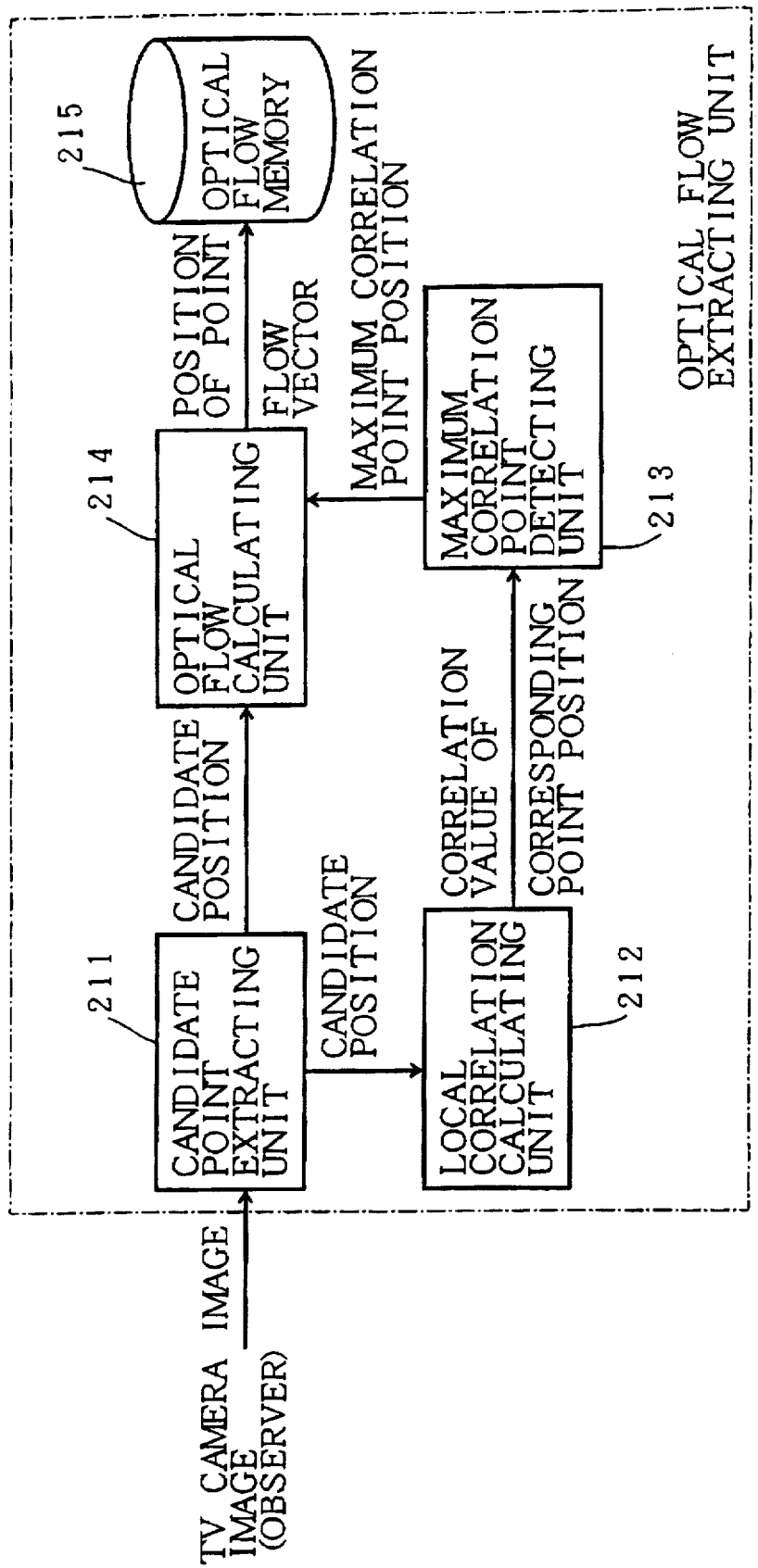
FIG. 29 is a block diagram for a specific embodiment of the optical flow extracting unit employed in the structure of FIG. 27.

FIG. 29 shows a structure of the optical flow extracting unit 210. In this embodiment, a specific example of flow detection by local correlation of characteristic points in the images will be described hereinafter.

The optical flow extracting unit 210 includes a candidate point extracting unit 211, a local correlation calculating unit 212, a maximum correlation point detecting unit 213, an optical flow calculating unit 214, and an optical flow memory 215.

The candidate point extracting unit 211 has a function for detecting a group of candidate points to find optical flows in a reference image. In practice, a local region of K pixels×K pixels is set in the image, and a process for calculating an intensity variance within the region is executed over all regions where a moving obstacle happens to appear.

The size K of the region is constant which is set in accordance with a kind and a size of an obstacle to be detected. A point having a small variance is included in a partial region flat about intensity and its extraction precision for optical flows is extremely low, so that it is excluded from the candidate points. Only a point having a variance larger than a predetermined threshold value is sequentially selected as a candidate point, and a position of the candidate point is transmitted into the local correlation calculating unit 212.

The calculating unit 212 sequentially calculates a correlation value between the local region of M pixels×M pixels centered at the candidate point (Xo, Yo) in the reference image and the local region of M pixels×M pixels at peripheral of each point within the neighboring region of the candidate point of the image at the next instant. The size of the neighboring region is set according to a speed of the moving obstacle. The size M of a correlation window is a constant set according to a kind, a size and a speed of an object to be detected.

The correlation value is calculated by the following equation:

$$\frac{\Sigma_{x,y}\Sigma_{k,l} I(x, y) J(x-k, y-l)}{\sqrt{\Sigma_{x,y} I(x, y)^2} \sqrt{\Sigma_{x,y} J(x, y)^2}} \qquad (25)$$

wherein I(x, y) and J(x, y) represent pixel intensity values of a reference image and an image on the next instant, and I and J represent average intensity within regions near candidate points in a reference image and an image at the next instant.

The maximum correlation point detecting unit 213 executes a process for finding a position (Xs, Ys) of a point in the image at the next a correlation value of which is maximal.

The optical flow calculating unit 214 calculates the difference (vx, vy)=(Xs-Xo, Ys-Yo) therebetween for writing into the optical flow memory 215 as optical flow vectors at a point (Xo, Yo) in the reference image.

Figure 30:
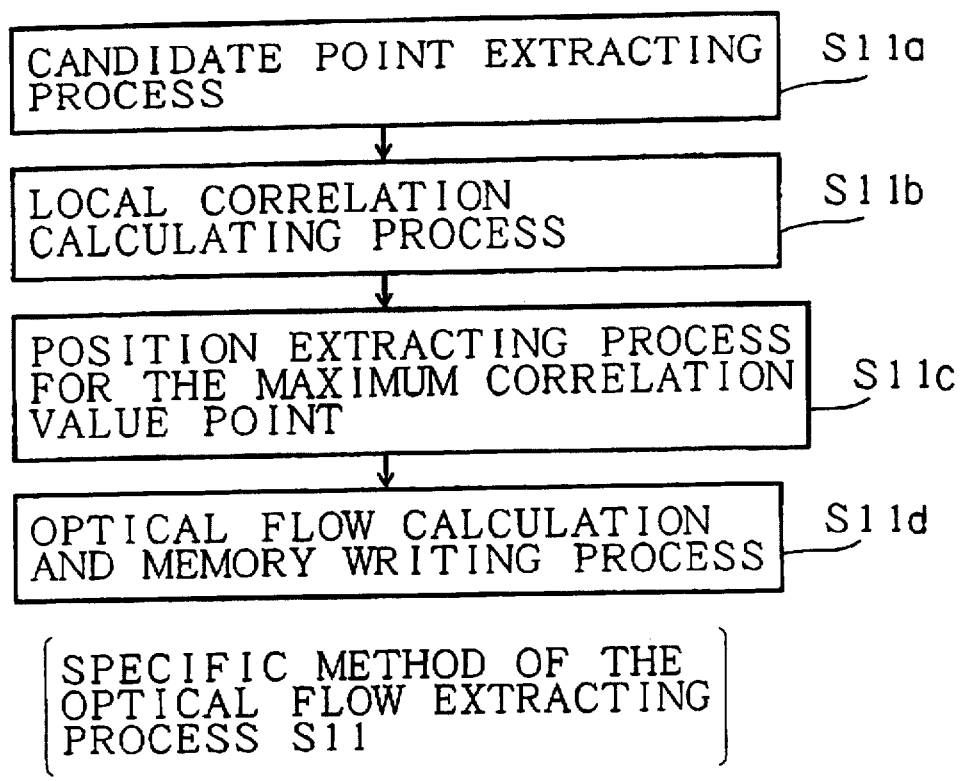
FIG. 30 is a flow chart of the processing flow corresponding to the respective components of the optical flow extracting unit of FIG. 29.

FIG. 30 shows a chart of the processing flow corresponding to the respective components of the optical flow extracting unit 210, which shows a practical method of the process at the step S11 (optical flow extracting process) of FIG. 28.

The candidate point extracting unit 211 detects a group of candidate points to find optical flows in a reference image for detection (candidate point extracting process (step S11a)). As described above, the extraction is done by a process that a local region of K pixels×K pixels is set in the image and a process for calculating an intensity variance within the region is executed over all regions where a moving obstacle happens to appear.

The size K of the region is constant which is set in accordance with a kind and a size of an obstacle for detection. A point having a small variance is included in a partial region flat about intensity and its extraction precision for optical flows is extremely low, so that it is excluded from the candidate points. Only a point having a change larger than a predetermined threshold value is sequentially selected as a candidate point. In the step S11a a candidate point is sequentially selected for extraction, and information about a position of the candidate point sequentially selected is transmitted into the local correlation calculating unit 212.

The calculating unit 212 sequentially calculates a correlation value between the local region of M pixels×M pixels centered at the candidate point (Xo, Yo) in the reference image and the local region of M pixels×X pixels at peripheral of each point within the neighboring region of the candidate point of the image at the next instant (local correlation calculating process (step S11b)). The size of the neighboring region is set according to speed of the moving obstacle. The size M of a correlation window is a constant set according to a kind, a size and a speed of an object to be detected. The correlation value is calculated by the EQUATION 25. After finding the correlation value in the step S11b, the maximum correlation point detecting unit 213 executes a process for finding a position (Xs, Ys) of a point in the image at the next a correlation value of which is the maximal (position extracting process for the maximum correlation value point (step S11c)).

The optical flow calculating unit 214 calculates the difference (vx, vy)—(Xs-Xo, Ys-Yo) therebetween for writing into the optical flow memory 215 as optical flow vectors at a point (Xo, Yo) in the reference image (optical flow calculation and memory writing process (step S11d)).

Referring to FIG. 31, there is shown an internal structure of the predicted image generating unit 220 which includes a predicted partial region setting unit 221, a next position predicting unit 222, and a predicted image generating unit 223.

In the predicted partial region setting unit 221, an image is previously divided into square small regions each having the size N pixels×N pixels, an initial position (Xs, Ys) of the flow vectors stored in the optical flow memory 215 of the optical flow extracting unit 210 is sequentially read, and a small region including the initial position (Xs, Ys) in the square small regions is chosen as a predicted partial region. The size N of the small region is constant subjected to the minimum size of an object for detection.

The next position predicting unit 222 estimates a position in the images of the predicted partial regions at the next instant by using the information about the dimension of the flow vectors stored in the optical flow memory 215.

Assuming that a central position of a square small position is (Xc, Yc) and its corresponding vector is (vx, vy) when a time interval of temporal image sequence is small, the central position at the next moves to a position (Xc+vx, Yc+vy) and the size of the region remains virtually unchanged with the square region N pixels×N pixels. Accordingly, in the predicted image generating unit 223, positions of the respective small regions at the next instant are found by parallel movement of the square small regions based on the flow vectors, and the images reflecting the positions of the respective small regions at the next instant are generated as predicted images for storage in a memory (not shown in any drawings).

FIG. 32 shows a flow chart of the processing flow corresponding to the respective components 221 to 223 of the predicted image generating unit 220, which corresponds to the processing steps S12 and S13 of FIG. 28.

In the predicted partial region setting unit 221 of the predicted image generating unit 220, an image is previously divided into square small regions each having the size of N pixels×N pixels, an initial position (Xs, Ys) of the flow vectors stored in the optical flow memory 215 of the optical flow extracting unit 210 is sequentially read (optical flow vector reading process (step S12a)), and a small region including the initial position (Xs, Ys) (square small region including (Xs, Ys) in the square small regions having the N pixels×N pixels) is chosen as a predicted partial region (predicted partial region selecting process (step s12b)). The size N of the small region is constant subject to the minimum size of an object to be detected.

After the predicted partial region selecting process S12b is finished, a predicted position calculating process is executed about the respective partial regions by the next position predicting unit 222. In the unit 222, a position in the images of the predicted partial regions at the next instant is estimated by using the information about the dimension of the flow vectors stored in the optical flow memory 215.

Assuming that a central position of a square small region is (Xc, Yc) and its corresponding flow vector is (vx, xy) when a time interval of temporal image sequence is small, the central position at the next moves to a position (Xc+vx, Yc+vy) and the size of the region remains virtually unchanged with the square region N pixels×N pixels. Accordingly, in the predicted image generating unit 223, positions of the respective small regions at the next instant are found by parallel movement of the square small regions based on the flow vectors (predicted position calculating process about the respective partial regions (step S13a)). The images obtained by the parallel movement of the square small regions are stored as predicted images (predicted image generating process (step S13a)).

Thus, predicted images are generated.

FIG. 33 shows an internal structure of the moving obstacle detecting unit 230 which includes an overlapped part detecting unit 231, a moving obstacle boundary candidate region detecting unit 232, and a moving obstacle detecting unit 233.

Figure 35A:
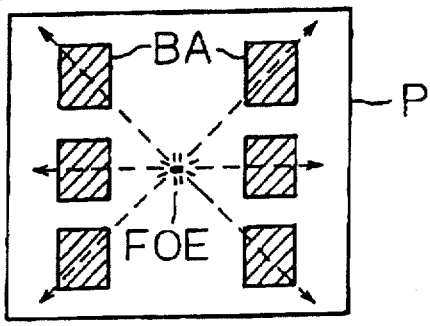
FIGS. 35A, 35B and 35C illustrate various examples of the motion of a small region in a predicted image in cases where the observer moves.

As shown in FIG. 35A, if the observer 201 obtaining an original image linearly moves in the predicted image P, the respective small regions BA included in the background move in generating directions from one point F.O.E. projected on an image in the movement directions.

Figure 35B:
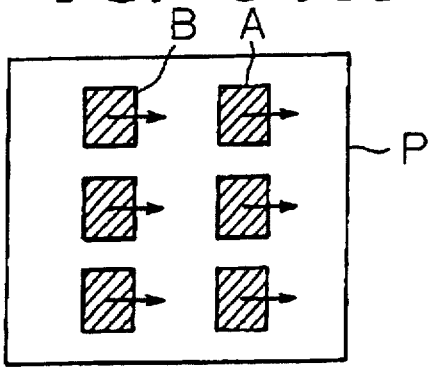

If the observer 201 moves in a rotary motion, the background region (the respective small regions BA included in the background) moves in parallel in a direction reversal to the rotary direction as shown in FIG. 35B. In the image P where any obstacle does not appear, the small regions BA do not have any overlapped part in the predicted image P and move to the respective independent portions.

Figure 35C:
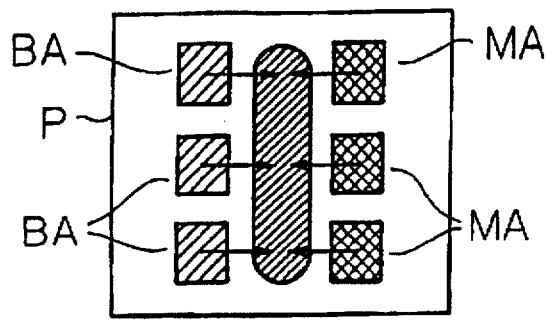

If a moving obstacle appears, small regions MA existing on the obstacle move to the locations shielding the background regions BA as shown in FIG. 35C, wherein both regions MA and BA approach each other to generate an overlap OLA of both regions.

In practice, when a moving obstacle exists in front of the background, the background region portion is shielded in the image at the next and only the obstacle is measured. Generally, the shielded region is longitudinally elongated partial region.

Thus, by detecting and analyzing the overlap OLA in the small regions on the predicted image P, the appearance of the moving obstacle is easily detected upon detecting the boundary portion in which the moving obstacle shields the background region.

This principle is employed in this system. The overlapped part detecting unit 231 in the moving obstacle detecting unit 230 extracts a portion overlapped by respective small regions in the predicted image generated by the predicted image generating unit 223 of the predicted image generating unit 220 to be applied to the moving obstacle boundary candidate region detecting unit 232.

The detecting unit 232 respectively detects connected regions in the overlapped part as a candidate region for the moving obstacle.

The detected candidate region includes detection error of optical flows. The detection error locally appears, but the region shielded by the moving obstacle appears with having a size larger than a predetermined size on the boundary portion of the moving obstacle.

The moving obstacle detecting unit 233 has a function for measuring a size and a width about the candidate region detected by the detecting unit 232, inquiring if the size is larger than a threshold value and the width is smaller than a threshold value, and judging the appearance of a moving obstacle when there exists a candidate area satisfying such inquiring. Based on the results of the measurement and judgment in the detecting unit 233, the appearance of the moving obstacle can be detected.

FIG. 34 shows a flow chart of the processing flow corresponding to the respective components of the moving obstacle detecting unit 230, and shows a practical process in the steps S15 and S16 of the flow chart of FIG. 28.

As shown in FIG. 35A, if the observer 201 obtaining an original image linearly moves in the predicted image P, the respective small regions included in the background move in directions originating at one point projected on an image in the moving directions. If the observer 201 moves in a rotary motion, the background region moves in parallel in a direction reversal to the rotary direction as shown in FIG. 35B. In the image where any obstacle does not appear, the small regions do not have any overlapped part in the predicted image and move to the respective independent portions.

If a moving obstacle appears, small regions existing on the obstacle move to the locations shielding the background regions as shown in FIG. 35C. In practice, when the moving obstacle exists in front of the background, the background region portion is shielded in the image at the next and only the obstacle is measured. Generally, the shielded region is longitudinally elongated partial region.

Thus, by detecting and analyzing the overlapped part of the small regions on the predicted image, the appearance of the moving obstacle is easily detected upon detecting the boundary portion in which the moving obstacle shields the background region.

The overlapped part detecting unit 231 extracts a portion overlapped by respective small regions in the predicted image generated by the predicted image generating unit 223 of the predicted image generating unit 220 to be applied to the moving obstacle boundary candidate region detecting unit 232 (small region overlapped part extracting process in the predicted images (step S15a)).

The moving obstacle boundary candidate region detecting unit 232 respectively detects the connected regions in the overlapped part as a candidate region for a moving obstacle. The detected candidate region includes detection error of optical flows. The detection error locally appears, but the region shielded by the moving obstacle appears with having a size larger than a predetermined size on the boundary portion of the moving obstacle. By judging the contiguity of the overlapped part, it is judged whether or not the candidate is a candidate obtained by detection error about an optical flow (overlapped part contiguity judging process (step S15b)). As a result of the judgment process, only correct candidate is selected.

The moving obstacle detecting unit 233 measures a size and a width about the candidate region detected and chosen by the detecting unit 232 (moving obstacle boundary candidate region detecting process (step S16a)). It is inquired if the size is larger than a threshold value and the width is smaller than a threshold value. The appearance of a moving obstacle is judged if there exists a candidate area satisfying such inquiring (moving obstacle detecting process by size judgment (step S16b)). Based on the results of the measurement and judgment in the detecting unit 233, the appearance of the moving obstacle can be detected.

Thus, according to this device, the optical flow extracting unit 210 obtains a television camera image generated in the observer 201, and analyzes a temporal variation of the images to extract an optical flow which is a motion of a local region unit. The observer 201 is assumed to move linearly, and the optical flows of a background region standing still relative to the environment exist on straight lines originating at one point (F.O.E.). In the predicted image generating unit 220, the image is divided into partial regions, a position prediction at the next instant is performed by a partial region unit centered at a point where the optical flows are obtained to generate a predicted image P. The moving obstacle detecting unit 230 extracts a portion OLA overlapped by a plurality of regions on the predicted image P to detect a region shielded by the moving obstacle in the background region, whereby the existence of the moving obstacle is detected.

This device measures the size of the extracted "portion OLA overlapped by a plurality of regions" for comparison with a threshold value to exclude any detection error about the optical flow, whereby a detection precision is maintained.

Thus, according to this invention, a moving obstacle included in the image taken by an observer can be detected simply and very precisely even when the observer moves, whereby the moving obstacle detecting device is provided most suitable for autonomous vehicles, intelligent robots, video monitoring system and so forth.

While the invention has been described and illustrated with respect to certain embodiments which give satisfactory results, it will be understood by those skilled in the art, after understanding the purpose of the invention, that various other changes and modifications may be made without departing from the spirit and scope of the invention.

What is claimed is:

1. A moving object detecting device comprising:
    an image taking means for taking in a plurality of images sequentially picked up while moving,
    a motion vector extracting means for extracting a plurality of motion vectors representing a position change of the object between the images taken by said image taking means,
    a region setting means for setting a plurality of small regions within the respective images,
    an intersection estimating means for extracting a plurality of motion vectors designating the small regions set by said region setting means from said motion vector extracting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by said intersection estimating means, and a moving object detecting means for detecting a moving object picked up within the image based on the residual of estimation calculated by said small region estimation residual calculating means.

2. A moving object detecting device comprising:

an image taking means for taking in a plurality of images of a background region containing a moving object which are sequentially picked up while moving.

a motion vector extracting means for extracting a plurality of motion vectors representing a position change of the object between the images taken by said image taking means, a motion vector selecting means for selecting a plurality of background region motion vectors each representing a position change of the background region other than said moving object already known from the motion vectors extracted by the motion vector extracting means, a rotation movement estimating means for estimating a rotation component of a motion of the image taking means based on the background region motion vectors selected by said motion vector selecting means, a motion vector correcting means for deleting the rotation component of the rotary motion of said image taking means based on the motion vectors extracted by said motion vector extracting means employing the rotation component estimated by said rotation movement estimating means, a region setting means for setting a plurality of small regions within the respective images, an intersection estimating means for extracting a plurality of motion vectors designating the small regions set by said region setting means from said motion vector correcting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by said intersection estimating means, and a moving object detecting means for detecting a moving object picked up within the image based on the residual of estimation calculated by said small region estimation residual calculating means.

3. A moving object detecting device comprising an image taking means for taking in a plurality of images sequentially picked up while moving, a motion vector extracting means for extracting a plurality of motion vectors representing a position change of the object between the images taken by said image taking means, a region setting means for setting a plurality of small regions within the respective images, an intersection estimating means for acquiring a plurality of motion vectors designating the small regions set by said region setting means from said motion vector extracting means and extending the respective motion vectors and for sequentially estimating intersections within the respective small regions which are intersections of the extended motion vectors, a small region estimation residual calculating means for calculating residual of estimation in the respective small regions in view of the respective intersections within the small regions sequentially estimated by said intersection estimating means, a total estimation residual calculating means for integrating residual of estimation of a plurality in the small regions of the same image calculated by said small region estimation residual calculating means to calculate all or a part of total residual of estimation on a plane of said image, and a moving object detecting means for detecting a moving object picked up within the image based on the distribution of the total residual of estimation in the images calculated by said total estimation residual calculating means.

4. A moving object detecting method comprising the steps of:

taking in a plurality of images sequentially picked up while moving, extracting a plurality of motion vectors representing a position change of an object between the taken images, setting a plurality of small regions within said respective images, selecting a plurality of motion vectors designating the set small regions from said extracted motion vectors and extending said respective motion vectors and sequentially estimating intersections within said respective small regions which are intersections of the extended motion vectors, calculating residual of estimation in the respective small regions in view of the respective intersections within said sequentially estimated small regions, and detecting a moving object picked up within the image based on the calculated residual of estimation.

5. A moving object detecting method comprising the steps of:

taking in a plurality of images of a background region containing a moving object which are sequentially picked up while moving.

extracting a plurality of motion vectors representing a position change of an object between the taken images, selecting a plurality of background region motion vectors each representing a position change of the background region other than said moving obstacle already known from the extracted motion vectors, estimating a rotation component of a motion when said image is taken in from the selected background region motion vectors, derotating the extracted motion vectors employing said estimated rotation component, setting a plurality of small regions within said respective images, extracting a plurality of motion vectors designating said set small regions from the derotated motion vectors and extending the respective motion vectors and sequentially estimating intersections within the respective small regions which are intersections of the extended motion vectors, calculating residual of estimation in the respective small regions in view of the respective intersections within said sequentially estimated small regions, and detecting a moving object picked up within the image based on the calculated residual of estimation.

6. A moving object detecting method comprising the steps of:

taking in a plurality of images sequentially picked up while moving, extracting a plurality of motion vectors representing a position change of an object between the taken images, setting a plurality of small regions within said respective images, acquiring a plurality of motion vectors designating said set small regions from said extracted motion vectors and extending the respective motion vectors and sequentially estimating intersections within the respective small regions which are intersections of the extended motion vectors, calculating residual of estimation in the respective small regions in view of the respective sequentially estimated intersections within the small regions, integrating the calculated residual of estimation of a plurality of the small regions of the same image to calculate all or a part of total residual of estimation on a plane of said image, and detecting a moving object picked up within the image based on the distribution of the calculated total residual of estimation in the images.

7. A moving object detecting device as set forth in any of claims 1, 2, or 3, wherein said moving object detecting means determines that there exists a moving object when residual of estimation or total residual of estimation is larger than a threshold value.

8. A moving object detecting method as set forth in any of claims 4, 5, or 6, which further includes a step of determining that a moving object exists when a calculated residual of estimation or calculated total residual of estimation is larger than a threshold value.

* * * * *